(12) United States Patent
Kasahara

(10) Patent No.: US 11,700,338 B2
(45) Date of Patent: Jul. 11, 2023

(54) INFORMATION PROCESSING SYSTEM THAT RECEIVES AUDIO OPERATIONS ON MULTIFUNCTION PERIPHERAL, AS WELL AS IMAGE PROCESSING APPARATUS AND CONTROL METHOD THEREFOR

(71) Applicant: CANON KABUSHIKI KAISHA, Tokyo (JP)

(72) Inventor: Ryosuke Kasahara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/824,405

(22) Filed: May 25, 2022

(65) Prior Publication Data

US 2022/0394141 A1  Dec. 8, 2022

(30) Foreign Application Priority Data

Jun. 4, 2021  (JP) ................................ 2021-094539

(51) Int. Cl.
*G06F 3/12* (2006.01)
*H04N 1/00* (2006.01)

(52) U.S. Cl.
CPC ..... *H04N 1/00403* (2013.01); *H04N 1/00244* (2013.01); *H04N 1/00408* (2013.01); *H04N 1/00474* (2013.01); *H04N 1/00488* (2013.01); *H04N 1/00493* (2013.01); *H04N 2201/0075* (2013.01); *H04N 2201/0094* (2013.01)

(58) Field of Classification Search
CPC .......... H04N 1/00403; H04N 1/00244; H04N 1/00408; H04N 1/00474; H04N 1/00488; H04N 1/00493; H04N 2201/0075; H04N 2201/0095
See application file for complete search history.

(56) References Cited

U.S. PATENT DOCUMENTS

2020/0193991 A1   6/2020  Saito
2021/0012771 A1*  1/2021  Tajima ................. G06F 3/1285

FOREIGN PATENT DOCUMENTS

JP        2020098229 A    6/2020

\* cited by examiner

*Primary Examiner* — Moustapha Diaby
(74) *Attorney, Agent, or Firm* — Rossi, Kimms & McDowell LLP

(57) ABSTRACT

An information processing system that improves the usability of the overall information processing system. The processing system, which includes an image processing apparatus and is capable of communicating with an audio control apparatus, outputs response information, as a response to the command generated based on a user's audio received through the audio control apparatus, wherein. Specifically, the processing system (a) in accordance with that a predetermined command generated based on first audio information received from an audio control apparatus associated with a first attribute information is obtained, outputs a first type of response information as a response to the predetermined command, and (b) in accordance with a predetermined command generated based on second audio information received from an audio control apparatus associated with a second attribute information is obtained, outputs a second type of response information as the response to the predetermined command.

8 Claims, 22 Drawing Sheets

FIG. 14

```
{
  "command":[
    {
      "operation":"GetPrintJobList"
    },
    {
      "parameter":{
        "isNearPrinter":"true",
      }
    }
  ]
}
```

```
{
  "command":[
    {
      "operation":"getFaxJobList"
    },
    {
      "parameter":{
        "isNearPrinter":"false",
        "isDisplay":"true",
      },
    }
  ]
}
```

1901

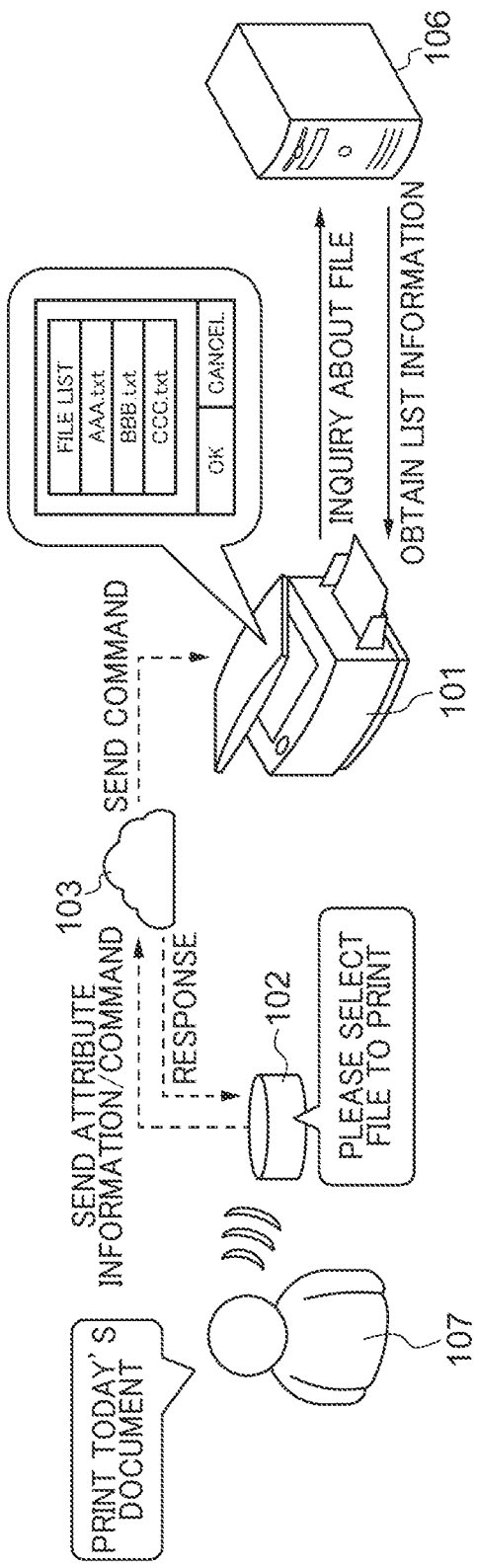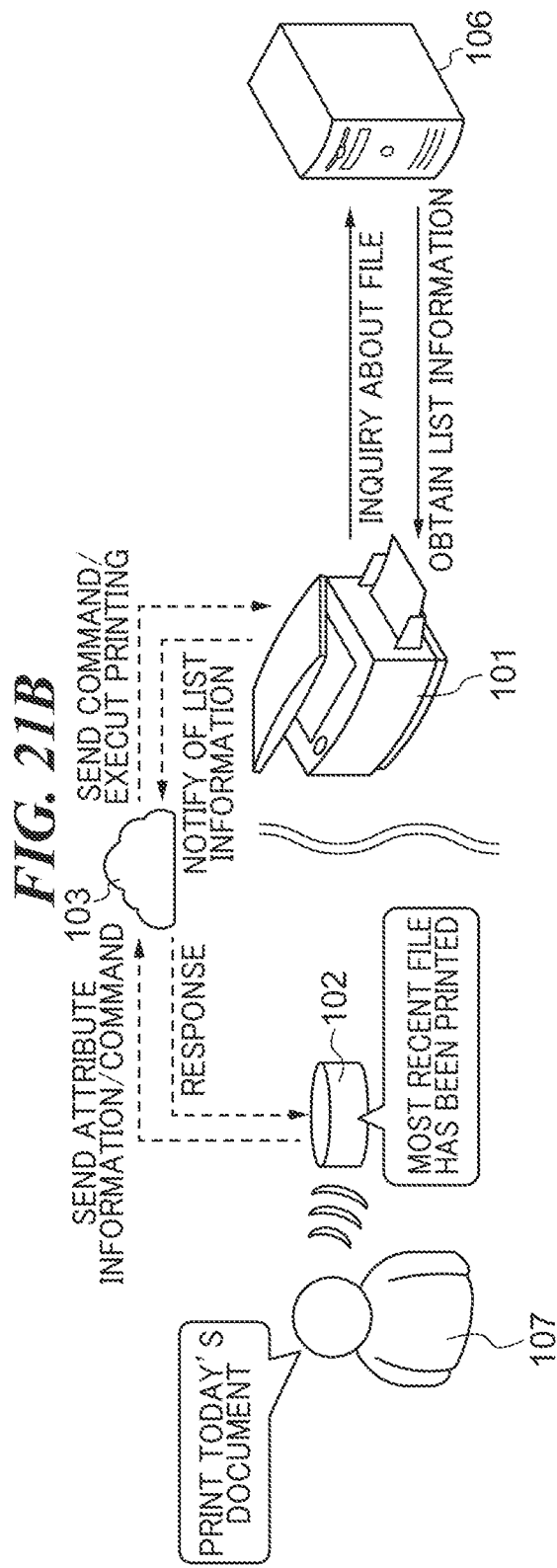

FIG. 22

| STATE OF AUDIO CONTROL APPARATUS AS INPUT SOURCE | COMMAND | ACTION |
|---|---|---|
| (NEAR) | COPY | SHIFT TO COPY FUNCTION SCREEN |
| (NEAR) | RECEIVE PRINT/SEND | DISPLAY JOB LIST OBTAINED FROM PRINT SERVER ON LUI OF IMAGE FORMING APPARATUS |
| (NEAR) | SCAN | SHIFT TO SCAN FUNCTION SCREEN |
| (NEAR) | SEND | SHIFT TO SEND FUNCTION SCREEN |
| (NEAR) | RECEIVE FAX | DISPLAY FAX PREVIEW IMAGE ON LUI OF IMAGE FORMING APPARATUS |
| (NEAR) | SEND FAX | SHIFT TO FAX FUNCTION SCREEN |
| (ONLY AUDIO INPUT) | COPY | NOTIFY BY AUDIO CONTROL APPARATUS OF THAT COMMAND CANNOT BE INPUT |
| (ONLY AUDIO INPUT) | RECEIVE PRINT/SEND | INSTRUCT IMAGE FORMING APPARATUS TO PRINT FIRST JOB IN JOB LIST OBTAINED FROM PRINT SERVER |
| (ONLY AUDIO INPUT) | SCAN | NOTIFY BY AUDIO CONTROL APPARATUS OF THAT COMMAND CANNOT BE INPUT |
| (ONLY AUDIO INPUT) | SEND | NOTIFY BY AUDIO CONTROL APPARATUS OF THAT COMMAND CANNOT BE INPUT |
| (ONLY AUDIO INPUT) | RECEIVE FAX | INSTRUCT IMAGE FORMING APPARATUS TO PRINT FIRST JOB IN JOB LIST OBTAINED FROM PRINT SERVER |
| (ONLY AUDIO INPUT) | SEND FAX | NOTIFY BY AUDIO CONTROL APPARATUS OF THAT COMMAND CANNOT BE INPUT |
| (EQUIPPED WITH LUI) | COPY | NOTIFY BY AUDIO CONTROL APPARATUS OF THAT JOB CANNOT BE INPUT |
| (EQUIPPED WITH LUI) | RECEIVE PRINT/SEND | DISPLAY JOB LIST OBTAINED FROM PRINT SERVER ON LUI OF IMAGE FORMING APPARATUS |
| (EQUIPPED WITH LUI) | SCAN | NOTIFY BY AUDIO CONTROL APPARATUS OF THAT JOB CANNOT BE INPUT |
| (EQUIPPED WITH LUI) | SEND | NOTIFY BY AUDIO CONTROL APPARATUS OF THAT JOB CANNOT BE INPUT |
| (EQUIPPED WITH LUI) | RECEIVE FAX | DISPLAY FAX PREVIEW IMAGE ON LUI OF AUDIO CONTROL APPARATUS |
| (EQUIPPED WITH LUI) | SEND FAX | NOTIFY BY AUDIO CONTROL APPARATUS OF THAT COMMAND CANNOT BE INPUT |

INFORMATION PROCESSING SYSTEM THAT RECEIVES AUDIO OPERATIONS ON MULTIFUNCTION PERIPHERAL, AS WELL AS IMAGE PROCESSING APPARATUS AND CONTROL METHOD THEREFOR

BACKGROUND OF THE INVENTION

Field of the Invention

The present invention relates to an information processing system that receives audio operations, as well as an image processing apparatus and control method therefor, in particular to an information processing system that receives audio operations on a multifunction peripheral, as well as an image processing apparatus and control method therefor.

Description of the Related Art

Conventionally, an audio operating apparatus such as a smart speaker, a manual operating apparatus such as a LUI (Local User Interface), and so forth have been used to perform input operations on an information processing apparatus.

For various types of information processing apparatuses that receive a plurality of input operations, there is a known technique that improves usability of input operations by, while performing a single input operation, avoiding receiving other input operations (Japanese Laid-Open Patent Publication (Kokai) No. 2020-98229).

However, the technique described in Japanese Laid-Open Patent Publication (Kokai) No. 2020-98229 is based on the assumption that both the audio operating apparatus and the manual operating apparatus are placed near a user. If this technique is applied to a case where the audio operating apparatus is located far from an image forming apparatus equipped with the manual operating apparatus, control may not be properly performed.

For example, assume that the user inputs an audio command such as "Print today's documents", which targets a plurality of files, on the audio operating apparatus. In this case, if the audio operating apparatus is located near the image forming apparatus equipped with the manual operating apparatus, by the manual operating apparatus displaying the plurality of target files in list on a screen, the user can see the plurality of target files on the screen. However, there may be a case where the said image forming apparatus is located far from the audio operating apparatus placed on a user's own desk, for example. In this case, even if the image forming apparatus displays the list on the screen of the manual operating apparatus in response to the audio, which is the above-mentioned audio command targeting a plurality of files, input to the audio operating apparatus by the user, the user cannot see the screen.

SUMMARY OF THE INVENTION

The present invention provides an information processing system that improves the usability of the overall information processing system, as well as an image processing apparatus and control method therefor.

Accordingly, the present invention provides a processing system that includes an image processing apparatus and is capable of communicating with an audio control apparatus, the processing system comprising one or more controllers configured to function as: a unit configured to receive, from the audio control apparatus, audio information generated based on audio received from a user; a unit configured to generate a command based on the audio information; and a unit configured to output response information, as a response to the command, wherein the one or more controllers perform a process (a) or (b) of: (a) in accordance with that a predetermined command generated based on first audio information received from an audio control apparatus associated with a first attribute information is obtained, outputting a first type of response information as a response to the predetermined command, and (b) in accordance with a predetermined command generated based on second audio information received from an audio control apparatus associated with a second attribute information is obtained, outputting a second type of response information as the response to the predetermined command.

Accordingly, the present invention provides an image processing apparatus that is capable of communicating with an audio control apparatus and a server, the image processing apparatus comprising one or more controllers configured to function as: a unit configured to receive a command, which is generated by the server based on audio information generated by the audio control apparatus based on audio received from a user; and a unit configured to output response information, as a response to the command, wherein the one or more controllers perform a process (a) or (b) of: (a) in accordance with that a predetermined command generated based on first audio information received from an audio control apparatus associated with a first attribute information is obtained, outputting a first type of response information as a response to the predetermined command, and (b) in accordance with a predetermined command generated based on second audio information received from an audio control apparatus associated with a second attribute information is obtained, outputting a second type of response information as the response to the predetermined command.

According to the present invention, the usability of the overall information processing system is improved.

Further features of the present invention will become apparent from the following description of exemplary embodiments with reference to the attached drawings.

BRIEF DESCRIPTION OF THE DRAWINGS

FIG. 14 is a view showing an example of data including a print job list obtaining command and attribute information, which are sent from the cloud server to the MFP.

FIG. 19 is a view showing an example of data including a FAX job list obtaining command, attribute information, and device configuration information, which are sent from the cloud server to the MFP.

FIGS. 21A and 21B are views useful in explaining operations that are performed by the apparatuses constituting the information processing system in the embodiment 1.

FIG. 22 is a view showing a list of operations of the information processing system according to states of the smart speaker and commands included in audio operations received by the smart speaker.

DESCRIPTION OF THE EMBODIMENTS

The present invention will now be described in detail below reference to the accompanying drawings showing embodiments thereof <Overall Arrangement of an Information Processing System>

Figure 1:
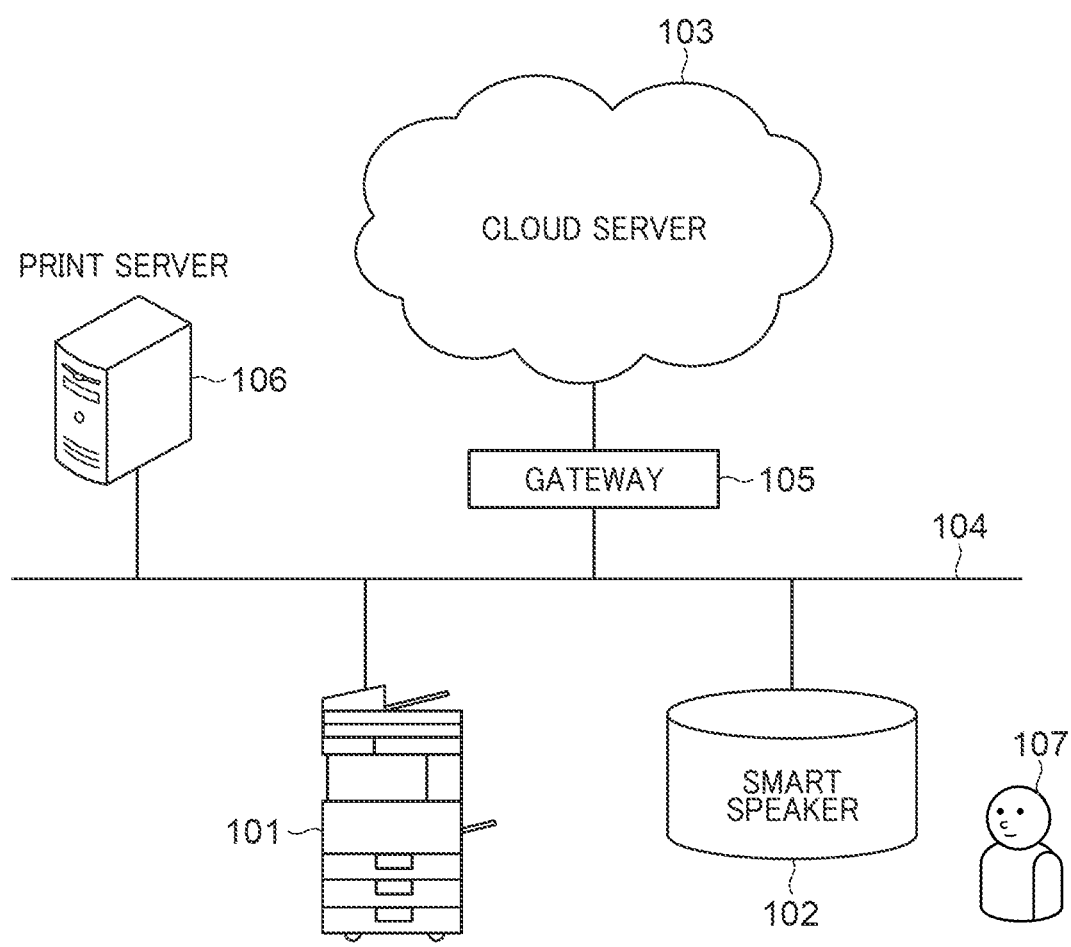
FIG. 1 is a view showing an overall arrangement of an information processing system according to an embodiment 1.

FIG. 1 is a view showing the overall arrangement of an information processing system according to an embodiment 1.

As shown in FIG. 1, the information processing system has an MFP 101 (image forming apparatus/image processing apparatus), a smart speaker 102 (audio control apparatus), a cloud server 103 (information processing apparatus), and a print server 106. The MFP 101, the smart speaker 102, and the cloud server 103 are capable of communicating with one another via a network 104 and a gateway 105.

The MFP 101 is a multifunction peripheral equipped with (capable of using) a plurality of functions such as a copying function, a scanning function, a printing function, and a faxing function, but may be a printer or scanner equipped with a single function. Detailed description of the hardware arrangement of the MFP 101 will be given later with reference to FIG. 2.

Figure 3:
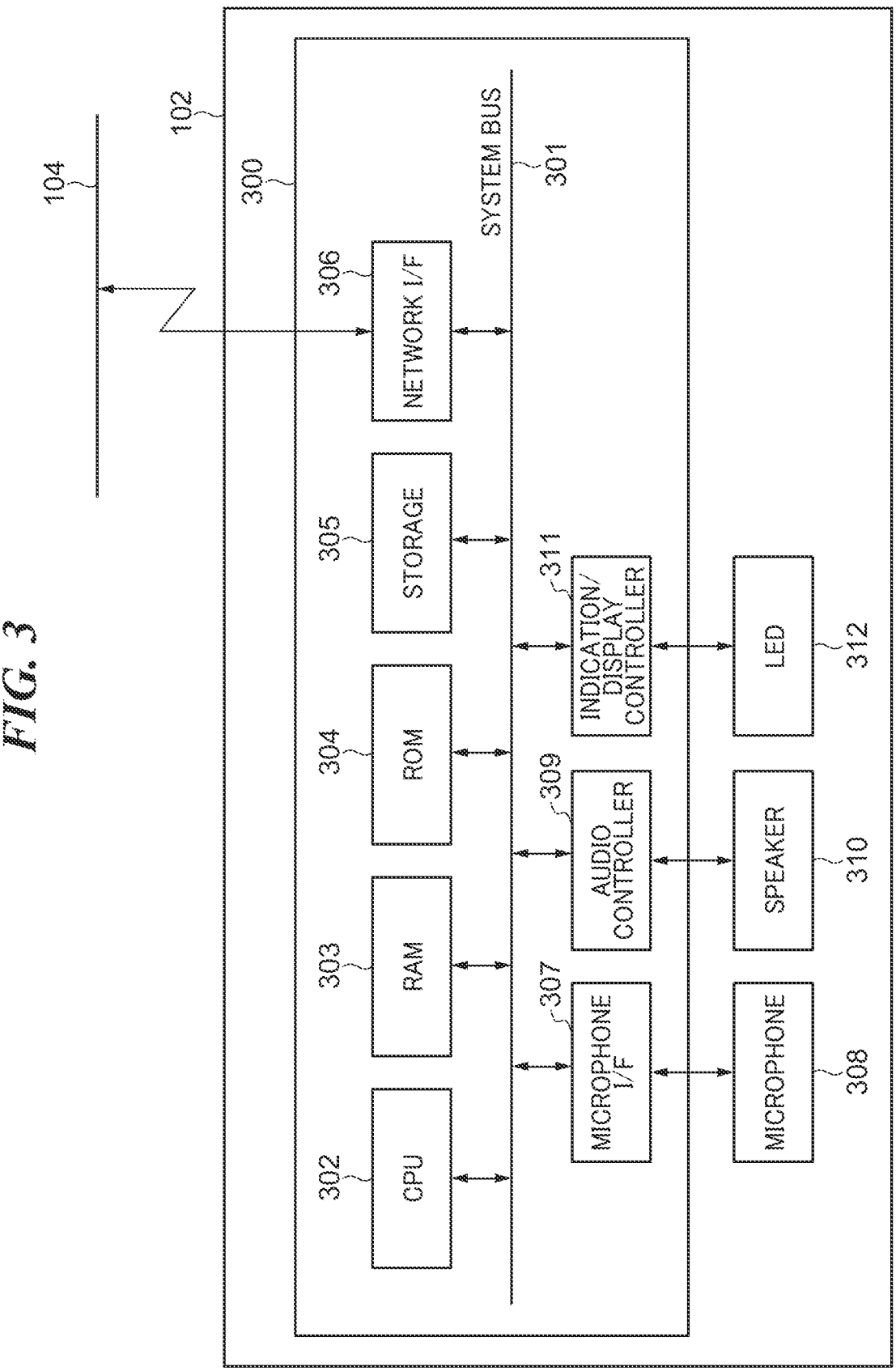
FIG. 3 is a block diagram showing a hardware arrangement of a smart speaker in FIG. 1.

The smart speaker 102 obtains audio from a user 107 through a microphone 308 (FIG. 3), codes the obtained audio into audio data (audio information), and sends the audio data to the cloud server 103 via the network 104 and the gateway 105. Upon receiving audio synthetic data from the cloud server 103 via the network 104 and the gateway 105, the smart speaker 102 reproduces the audio synthetic data through a speaker 310 (FIG. 3). Detailed description of the hardware arrangement of the smart speaker 102 will be given later with reference to FIG. 3.

The cloud server 103 performs audio recognition of audio data from the user 107, which is sent from the smart speaker 102, such as "Execute job" and "Job settings", and generates job information based on the audio recognition result. Then, the cloud server 103 sends the generated job information to the MFP 101 via the network 104 and the gateway 105. After that, the cloud server 103 generates audio synthetic data, which is for notifying the user 107 that the job information has been sent to the MFP 101, and send it to the smart speaker 102 via the network 104 and the gateway 105.

The cloud server 103 communicates with the MFP 101 and the smart speaker 102 using an IP address and a MAC address.

The network 104 connects the MFP 101, the smart speaker 102, the cloud server 103, and the gateway 105 to one another. As a result, various types of data such as audio data obtained by the smart speaker 102 and job information about a print job, a scan job, and so forth generated by the cloud server 103 are sent and received via the network 104.

The gateway 105 is, for example, a wireless LAN router compliant with the IEEE 802.11 series of standards. The gateway 105, however, may have a capability of operating according to other wireless communication methods. In addition, the gateway 105 may not be a wireless LAN router but may be a wired LAN router compliant with the Ethernet standards typified by 10BASE-T, 100BASE-T, 1200BASE-T, and so forth, and may operate according to other wired communication methods. It should be noted that the IEEE 802.11 series of standards include a series of standards belonging to IEEE 802.11 such as IEEE 802.11a and IEEE802.11b.

It should be noted that the embodiments described below do not limit the invention set forth in the scope of patent claims, and all combinations of features in the embodiments described below should not always be essential to solving problems of the present invention.

The print server 106 is a server that manages print data and sends print data corresponding to the request sent from the MFP 101 via the network 104, to the MFP 101.

<Arrangement of an MFP>

Figure 2:
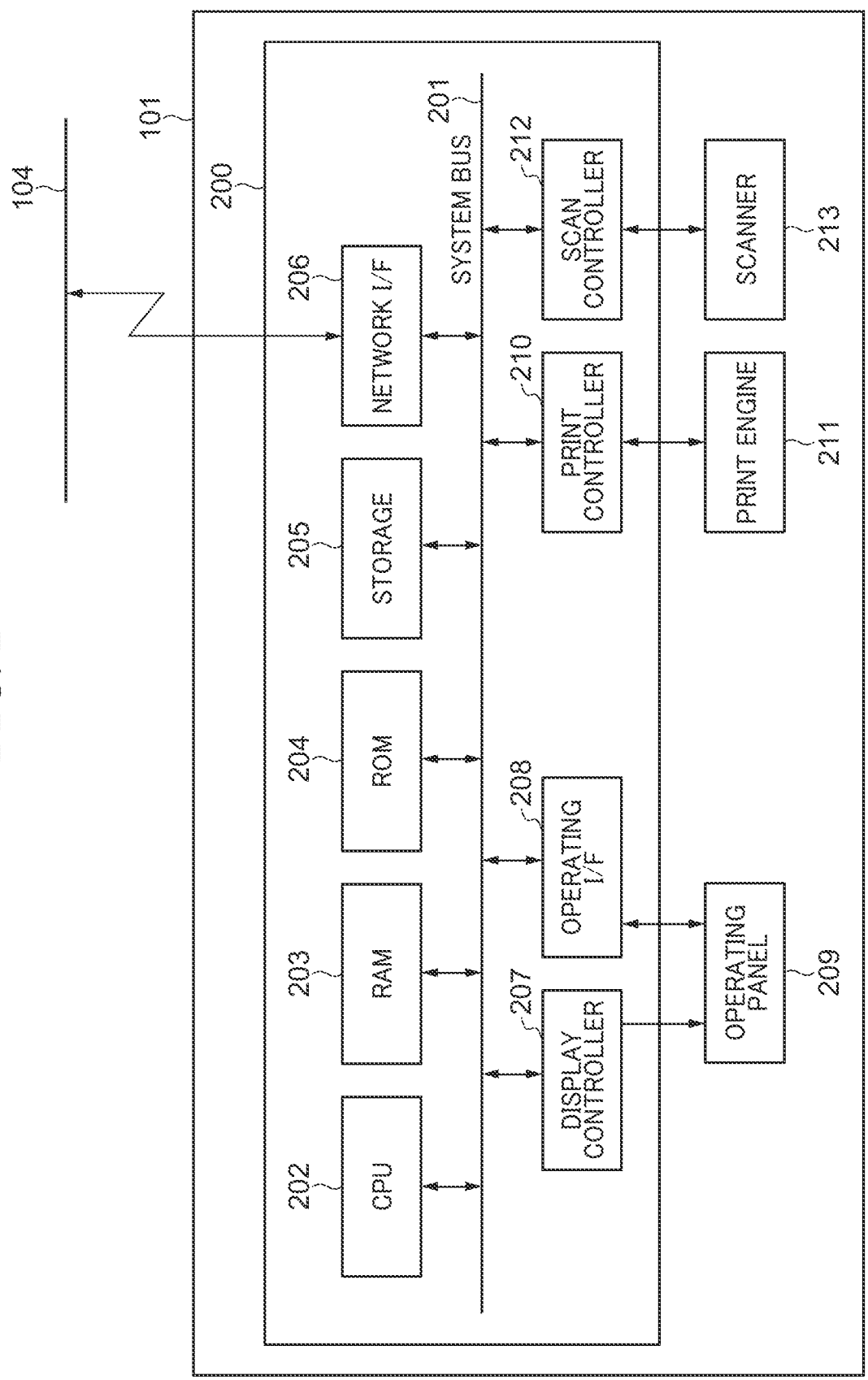
FIG. 2 is a block diagram showing a hardware arrangement of an MFP in FIG. 1.

FIG. 2 is a block diagram showing a hardware arrangement of the MFP 101.

As shown in FIG. 2, the MFP 101 has a controller unit 200, an operating panel 209, a print engine 211, and a scanner 213.

The controller unit 200 has a CPU 202, a RAM 203, a ROM 204, a storage 205, a network I/F 206, a display controller 207, an operating I/F 208, a print controller 210, and a scan controller 212. These component elements are connected together by a system bus 201 such that they can communicate with one another.

The CPU 202 is a central processing unit that controls the overall operation of the controller unit 200. The CPU 202 reads control programs stored in the ROM 204 or the storage 205 to perform various types of control such as reading control and printing control.

The RAM 203 is a volatile memory that is used as a main storage memory for the CPU 202. The RAM 203 is used as a work area and also used as a temporary storage area for various types of control programs stored in the ROM 204 and the storage 205 to be developed.

The ROM 204 is a nonvolatile memory and stores control programs executable by the CPU 202.

The storage 205 is a storage device that has a larger storage capacity than that of the RAM 203. Print data, image data, various programs, and various types of setting information are stored in the storage 205.

It should be noted that in the present embodiment, in the MFP 101, one CPU 202 executes processes in flowcharts, which will be described later, using one memory (the RAM 203), but another form may be used. For example, a plurality of CPUs, RAMs, ROMs, and storages may work in collaboration with one another to carry out the processes in the flowcharts, which will be described later. Some of the processes may be carried out using a hardware circuit such as an ASIC (Application-Specific Integrated Circuit) or an FPGA (Field-Programmable Gate Array).

The network I/F 206 is an interface for the MFP 101 to communicate with external apparatuses via the network 104. The MFP 101 analyzes print data, which is received via the network I/F 206, using a software module (PDL analysis unit, not shown) for analyzing print data stored in the storage 205 or the ROM 204. The PDL analysis unit generates data for the printer engine 211 to perform printing based on print data expressed in various page description languages.

The display controller 207, which is connected to the operating panel 209 comprised of an LCD touch panel, controls display of screens on the operating panel 209 in response to instructions from the CPU 202.

The operating I/F 208 is connected to the operating panel 209. When the user 107 operates the operating panel 209 as prompted by a screen displayed on the operating panel 209, the operating I/F 208 detects an event corresponding to this user operation and sends the detected event to the CPU 202.

The print controller 210 is connected to the print engine 211. A control command and image data to be printed are transferred to the print engine 211 via the print controller 210.

The print engine 211 forms an image on a sheet based on the received control command and image data to be printed. The print engine 211 may perform printing using either the electrophotographic printing method or the inkjet method. When the electrophotographic printing method is used, the print engine 211 forms an image on a sheet by forming an electrostatic latent image on a photosensitive body, developing the electrostatic latent image with toner to form a toner image, transferring the toner image onto the sheet, and fixing the transferred toner image. On the other hand, when the inkjet method is used, an image is formed on a sheet by jetting ink.

The scan controller 212 is connected to the scanner 213. The scan controller 212 receives image data, which is generated by the scanner 213 reading an image on a sheet, from the scanner 213. The image data generated by the scanner 213 is stored in the storage 205. The MFP 101 also has a copying function of causing the print engine 211 to form an image on a sheet based on image data generated by the scanner 213.

The scanner 213 has an original feeder (not shown) and is capable of reading originals placed on the original feeder while conveying them one by one.

<Arrangement of a Smart Speaker>

FIG. 3 is a block diagram showing a hardware arrangement of the smart speaker 102.

As shown in FIG. 3, the smart speaker 102 has a controller unit 300, the microphone 308 that is an audio input device, the speaker 310 that is an audio output device, and an LED 312 that is a notification device.

The controller unit 300 has a CPU 302, a RAM 303, a ROM 304, a storage 305, a network I/F 306, a microphone I/F 307, an audio controller 309, and an indication controller 311 (a display controller 311). These component elements are connected together by a system bus 301 such that they can communicate with one another.

The CPU 302 is a central processing unit that controls the overall operation of the controller unit 300. The CPU 302 develops control programs stored in the storage 305 onto the RAM 303 to perform various types of control such as audio input control and audio output control.

The RAM 303 is a volatile memory that is used as a main storage memory for the CPU 302. The RAM 303 is used as a work area and also used as a temporary storage area for various types of control programs stored in the storage 305 to be developed.

The ROM 304 is a nonvolatile memory and stores a boot program for the CPU 302.

The storage 305 is a storage device (for example, an SD card) having a larger storage capacity than that of the RAM 303. The storage 305 stores a control program for the smart speaker 102, which is executed by the CPU 302. It should be noted that the storage 305 may be replaced by a flash ROM or the like other than the SD card, and also may be replaced by another storage device having functions equivalent to those of the SD card.

The CPU 302 executes the boot program stored in the ROM 304 at start-up (at turning-on of the power). The boot program is for reading a control program stored in the storage 305 and developing the control program on the RAM 303. After executing the boot program, the CPU 302 subsequently executes the control program developed on the RAM 303 to perform control. The CPU 302 also stores data, which is used in executing the control program, on the RAM 303, and reads and writes the said data. Setting values required to execute the control program can also be stored on the storage 305, and the setting values are read and written by the CPU 302. The CPU 302 communicates with external apparatuses via the network I/F 306 and the network 104.

The network I/F 306 includes a circuit and antenna for connecting to the network 104 using a wireless communication method compliant with the IEEE 802.11 series of standards so that the smart speaker 102 can communicate with external apparatuses. The communication method, however, is not limited to the wireless communication method, but may be a wired communication method compliant with the Ethernet standards.

The microphone I/F 307, which is connected to the microphone 308, converts voice uttered by the user 107 and input through the microphone 308, into coded audio data, and holds it in the RAM 303 in response to an instruction from the CPU 302.

The microphone 308 is, for example, a small MEMS microphone installed in a smartphone or the like, but may be replaced by other devices as long as they are capable of obtaining audio from the user 107. It is preferred that three or more microphone 308 are placed at predetermined positions so as to calculate the direction from which voice uttered by the user 107 is coming. The present embodiment, however, can be implemented also when the number of microphones 308 is one or two, and hence the number of microphones 308 should not necessarily be three.

The audio controller 309, which is connected to the speaker 310, converts audio data into an analog audio signal in response to an instruction from the CPU 302 and outputs audio through the speaker 310.

The speaker 310 reproduces a device response sound indicating that the smart speaker 102 is responding to audio from the user 107 and audio synthesized by the cloud server 103. The speaker 310 may be a universal device for reproducing audio.

The indication controller 311, which is connected to the LED 312, controls indication by the LED 312 in response to an instruction from the CPU 302. In the present embodiment, the indication controller 311 mainly controls turning-on of the LED 312 for indicating that the smart speaker 102 is properly receiving audio from the user 107. The LED 312 is, for example, an LED that emits light in such a color (for example, blue) that the user 107 can recognize turning-on/off thereof. The LED 312 is a universal device. It should be noted that the LED 312 may be replaced by an LUI capable of displaying text and pictures.

<Arrangement of a Cloud Server>

Figure 4:
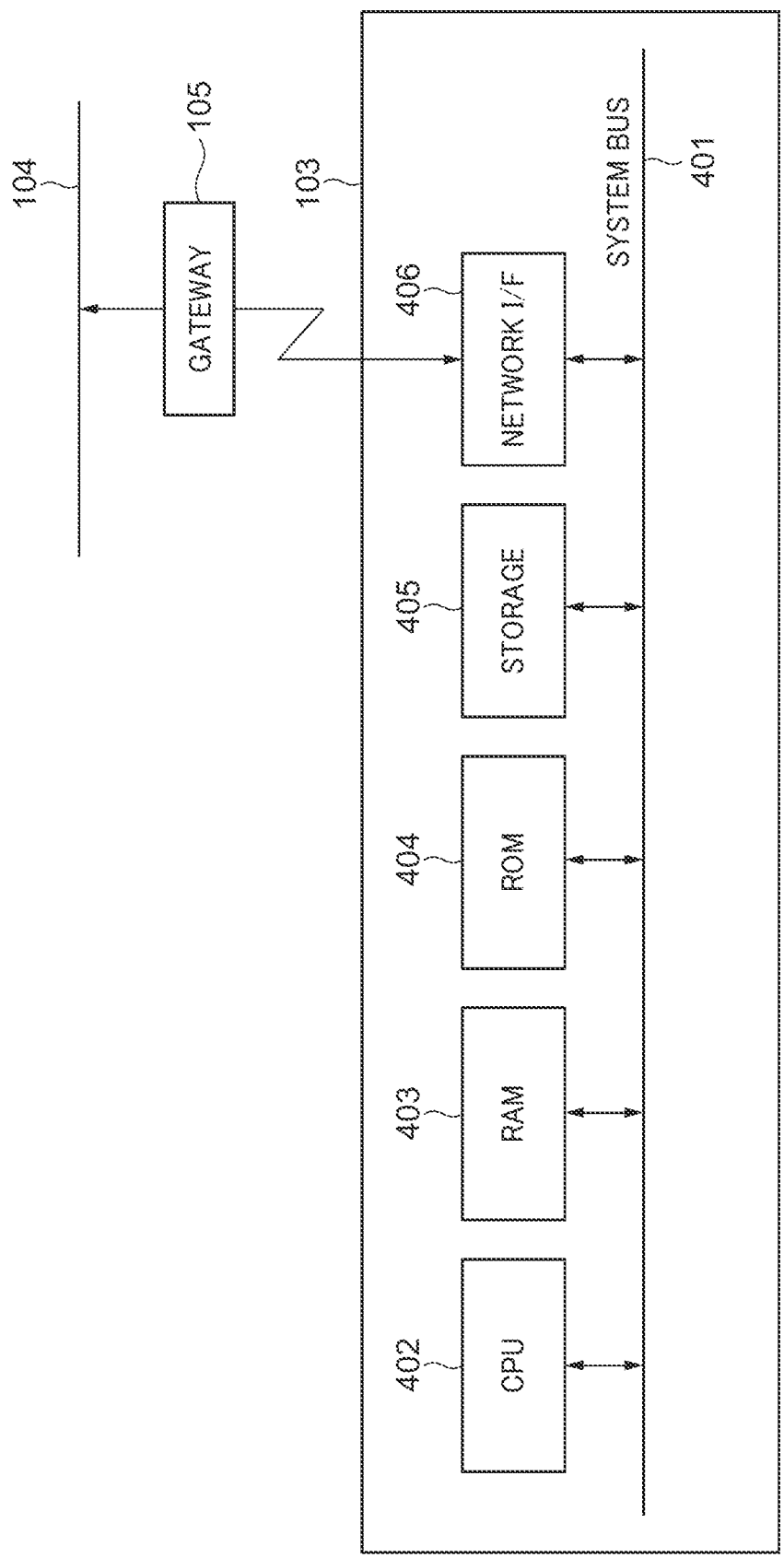
FIG. 4 is a block diagram showing a hardware arrangement of a cloud server in FIG. 1.

FIG. 4 is a block diagram showing a hardware arrangement of the cloud server 103.

As shown in FIG. 4, the cloud server 103 has a CPU 402, a RAM 403, a ROM 404, a storage 405, and a network I/F 406. These component elements are connected together by a system bus 401 such that they can communicate with one another.

The CPU 402 is a central processing unit that controls the overall operation of the cloud server 103. The CPU 402 develops control programs stored in the storage 405 onto the RAM 403 to carry out, for example, an audio recognition process.

The RAM 403 is a volatile memory that is used as a main storage memory for the CPU 402. The RAM 403 is used as a work area and also used as a temporary storage area for various types of control programs stored in the storage 405 to be developed.

The ROM 404 is a nonvolatile memory and stores a boot program for the CPU 402.

The storage 405 is a storage device (for example, a hard disk drive: HDD) having a larger storage capacity than that of the RAM 403. The storage 405 stores a control program for the cloud server 103, which is executed by the CPU 402. It should be noted that the storage 405 may be a solid-state drive (SSD) or the like, and also may be replaced by another storage device having functions equivalent to those of a hard disk drive.

The CPU 402 executes the boot program stored in the ROM 404 at start-up (for example, at turning-on of the power). The boot program is for reading a control program stored in the storage 405 and developing the control program on the RAM 403. After executing the boot program, the CPU 402 subsequently executes the control program developed on the RAM 403 to perform control. The CPU 402 also stores data, which is used in executing the control program, on the RAM 403, and reads and writes the said data. Setting values required to execute the control program can also be stored on the storage 405, and the setting values are read and written by the CPU 402. The CPU 402 also communicates with other apparatuses on the network 104 via the network I/F 406 and the gateway 105.

<Arrangement of a Print Server>

Figure 5:
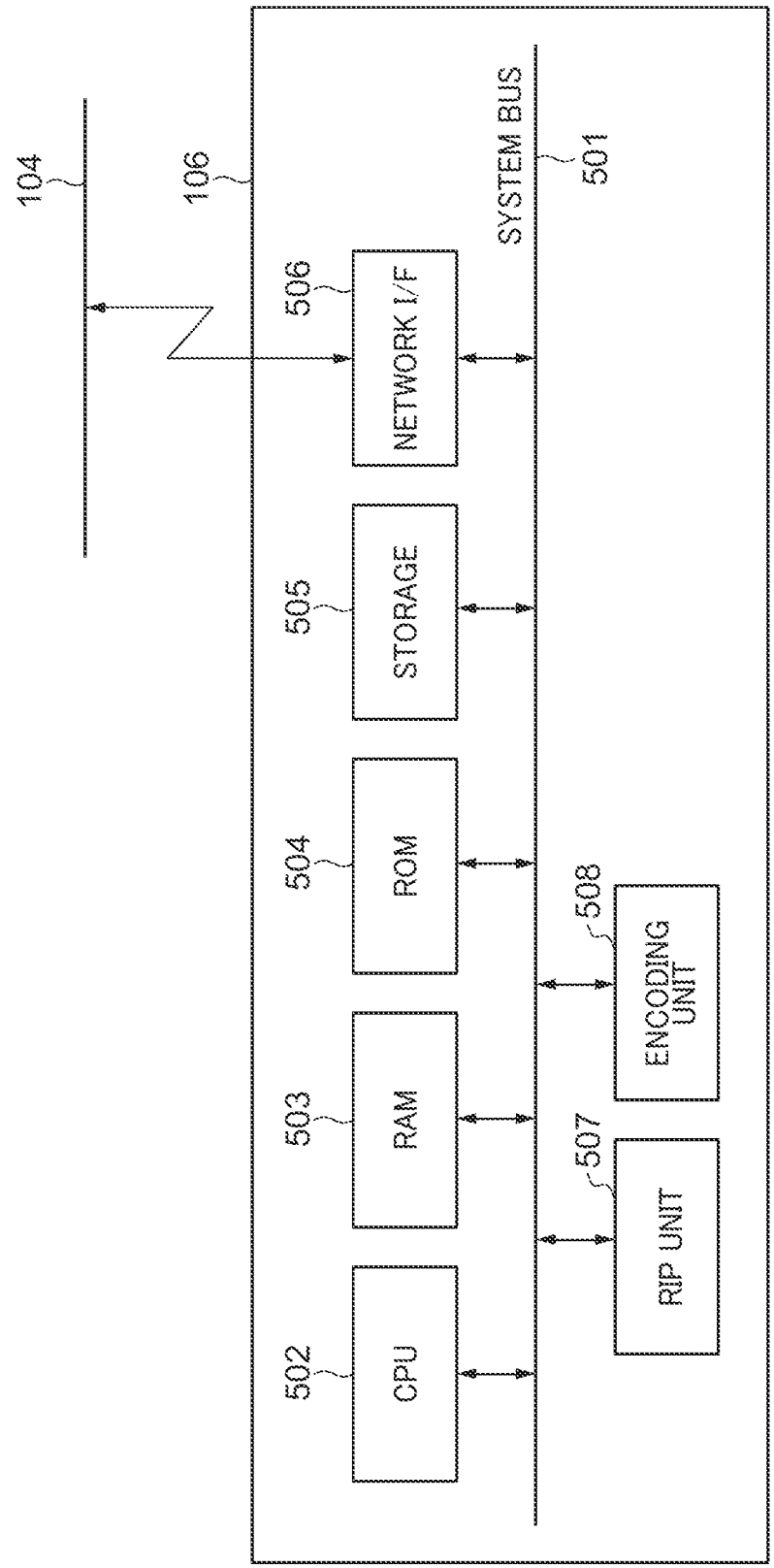
FIG. 5 is a block diagram showing a hardware arrangement of a print server in FIG. 1.

FIG. 5 is a block diagram showing a hardware arrangement of the print server 106.

As shown in FIG. 5, the print server 106 has a CPU 502, a RAM 503, a ROM 504, a storage 505, a network I/F 506, a RIP unit 507, and an encoding unit 508. These component elements are connected together by a system bus 501 such that they can communicate with one another.

The CPU 502 is a central processing unit that controls the overall operation of the print server 106. The CPU 502 develops control programs stored in the storage 505 onto the RAM 503 to, for example, manage print data.

The RAM 503 is a volatile memory that is used as a main storage memory for the CPU 502. The RAM 503 is used as a work area and also used as a temporary storage area for various types of control programs stored in the storage 505 to be developed.

The ROM 504 is a nonvolatile memory and stores a boot program for the CPU 502.

The storage 505 is a storage device (for example, a hard disk drive: HDD) having a larger storage capacity than that of the RAM 503. The storage 505 stores a control program for the print server 106 and print data, which are executed by the CPU 502. It should be noted that the storage 505 may be a solid-state drive (SSD) or the like, and also may be replaced by another storage device having functions equivalent to those of a hard disk drive.

The CPU 502 executes the boot program stored in the ROM 504 at start-up (for example, at turning-on of the power). The boot program is for reading a control program stored in the storage 505 and developing the control program on the RAM 503. After executing the boot program, the CPU 502 subsequently executes the control program developed on the RAM 303 to perform control. The CPU 502 also stores data, which is used in executing the control program, on the RAM 503, and reads and writes the said data. Various setting values required to execute the control program can also be stored on the storage 305, and the setting values are read and written by the CPU 502. The CPU 502 also communicates with external apparatuses via the network I/F 506 and the network 104.

The RIP unit 507 generates raster data from PDL data received from the external apparatuses.

The encoding unit 508 converters the raster data generated by the RIP unit 507 into print data in a format or a data format supported by the MFP 101.

<Functional Arrangement of a Device Control Program>

Figure 6:
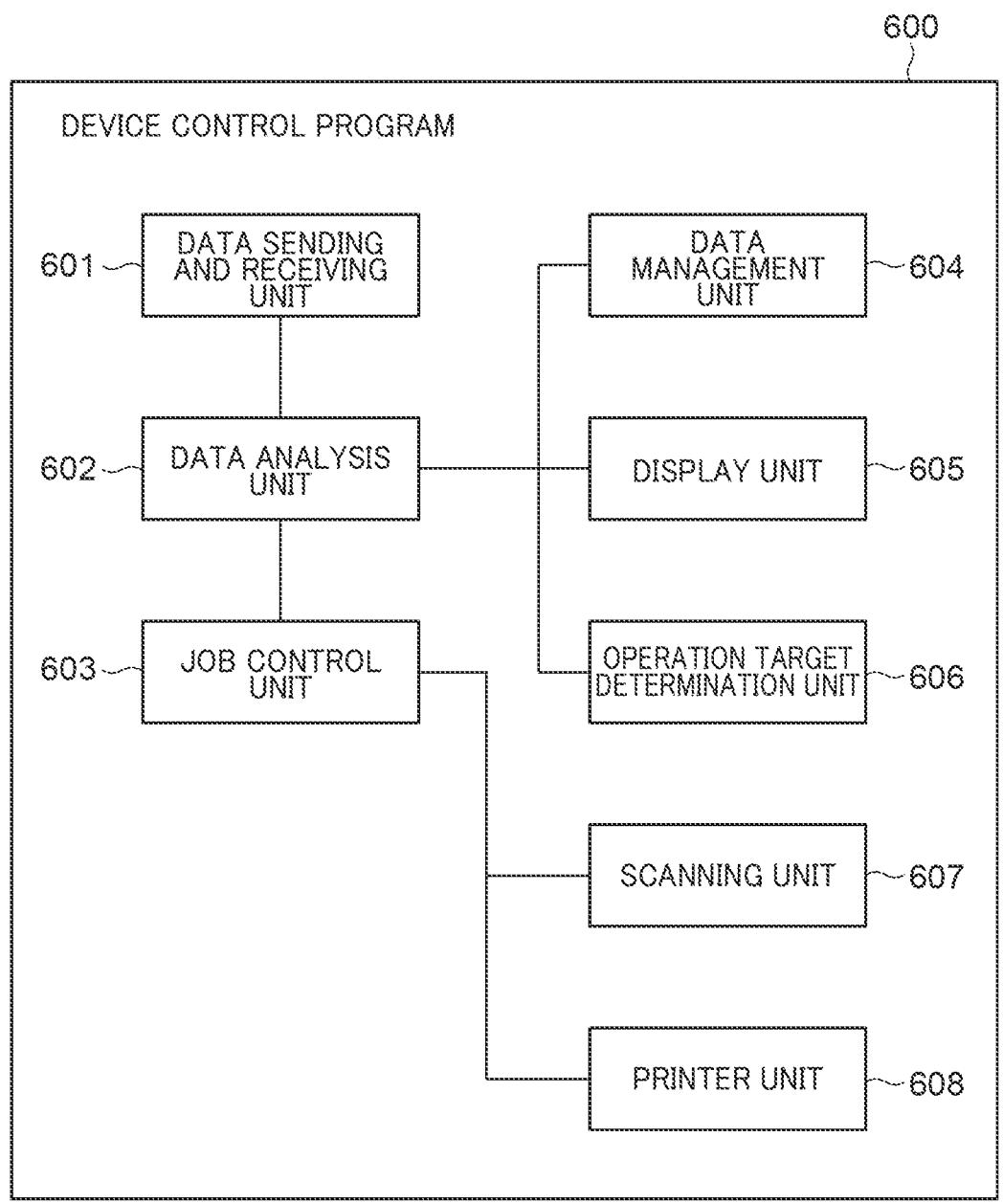
FIG. 6 is a block diagram showing a functional arrangement of a device control program that is executed by the MFP.

FIG. 6 is a block diagram showing a functional arrangement of a device control program 600 that is executed by the MFP 101.

The device control program 600 for the MFP 101 is stored in the ROM 204 as described earlier, and at start-up, the CPU 202 develops the device control program 600 on the RAM 203 and execute it.

The device control program 600 has a data sending and receiving unit 601, a data analysis unit 602, a job control unit 603, a data management unit 604, a display unit 605, an operation target determination unit 606, a scanning unit 607, and a printer unit 608. As shown in FIG. 6, the job control unit 603 is connected to the scanning unit 607 and the printer unit 608, and the data analysis unit 602 is connected to the data sending and receiving unit 601, the job control unit 603, the data management unit 604, the display unit 605, and the operation target determination unit 606.

The data sending and receiving unit 601 sends and receives data to and from other apparatuses on the network 104 using TCP/IP via the network I/F 206. The data sending and receiving unit 601 sends and receives data to and from the cloud server 103 via the gateway 105 on the network 104. Specifically, the data sending and receiving unit 601 receives device operating data generated by the cloud server 103 and sends various notifications to the cloud server 103. The various notifications include a screen update notification indicating that what being displayed on a screen indicating a job execution result or a result of response to device operating data, and a job execution status notification indicating a job status, has been updated. Detailed descriptions of the screen update notification and the job execution status notification will be given later with reference to sequence diagrams of FIG. 10 and FIG. 20.

The data analysis unit 602 converts device operating data received by the data sending and receiving unit 601 into a command that is communicated by each module in the device control program 600. The data analysis unit 602 then sends the said command to any of the job control unit 603, the data management unit 604, and the display unit 605 according to contents of the command.

The job control unit 603 issues instructions to control the scanning unit 607 and the printer unit 608. For example, when the user 107 depresses a start key while the display unit 605 is displaying a copy function screen, the job control unit 603 receives copy job parameters and a job starting instruction from the operation target determination unit 606. The job control unit 603 then generates scan job parameters and print job parameters from the received copy job parameters, and sends the scan job parameters to the scanning unit 607 and sends the print job parameters to the printer unit 608. Thus, the job control unit 603 controls the scanning unit 607 and the printer unit 608 such that image data read by the scanner 213 is printed on a sheet by the print engine 211. It should be noted that how scanning is controlled and how printing is controlled are not the gist, and hence further descriptions thereof are omitted.

The data management unit 604 stores various data including work data generated during execution of the device control program 600, setting parameters required to control each device, and so forth, into predetermined areas on the RAM 203 and the storage 205, and manages them. For example, the data management unit 604 stores and manages job data that is comprised of a combination of setting items and setting values for a job (described later) to be executed by the job control unit 603, language settings that are information about languages to be displayed on the operating panel 209, and the like. The data management unit 604 also stores and manages authentication information required for communication with the gateway 105, device information required for communication with the cloud server 103, and image data to be subjected to an image forming process by the MFP 101. The data management unit 604 also stores and manages, with respect to each screen displayed by the display unit 605, screen control information to be used for the display unit 605 to control screen display, and operation target determination information to be used for the operation target determination unit 606 to determine an operation target.

The display unit 605 controls the operating panel 209 via the display controller 207. Specifically, for example, the display unit 605 displays UI components (such as buttons, drop-down list, and checkbox), which can be operated by the user, on the operating panel 209, and updates the screen of the operating panel 209 based on screen display control information. For example, the display unit 605 obtains a language dictionary corresponding to a language setting stored in the data management unit 604 from the storage 205 and displays text data based on the language dictionary on the screen of the operating panel 209.

The operation target determination unit 606 obtains a coordinate of a touched position on the operating panel 209 via the operating I/F 208, and determines, as an operation target, a UI component which is displayed on the operating panel 209 at this time and can be operated by the user 107. The operation target determination unit 606 reads screen display control information corresponding to the UI component determined as the operation target, and based on this screen display control information, determines what type of processing to be performed when the UI component determined as the operation target receives an operation. For example, the operation target determination unit 606 outputs an instruction to update what to be displayed on the screen to the display unit 605, and also sends parameters for a job set by user operation and an instruction to start the said job, to the job control unit 603.

The scanning unit 607, based on scan job parameters sent from the job control unit 603, causes the scanner 213 to perform scanning via the scan controller 212, and stores a scan image obtained by the scanning in the data management unit 604.

The printer unit 608 causes the print engine 211 to perform a printing of the image data stored in the data management unit 604, via the print controller 210, based on print job parameters sent from the job control unit 603.

<Functional Arrangement of an Audio Control Program for an Audio Control Apparatus>

Figure 7:
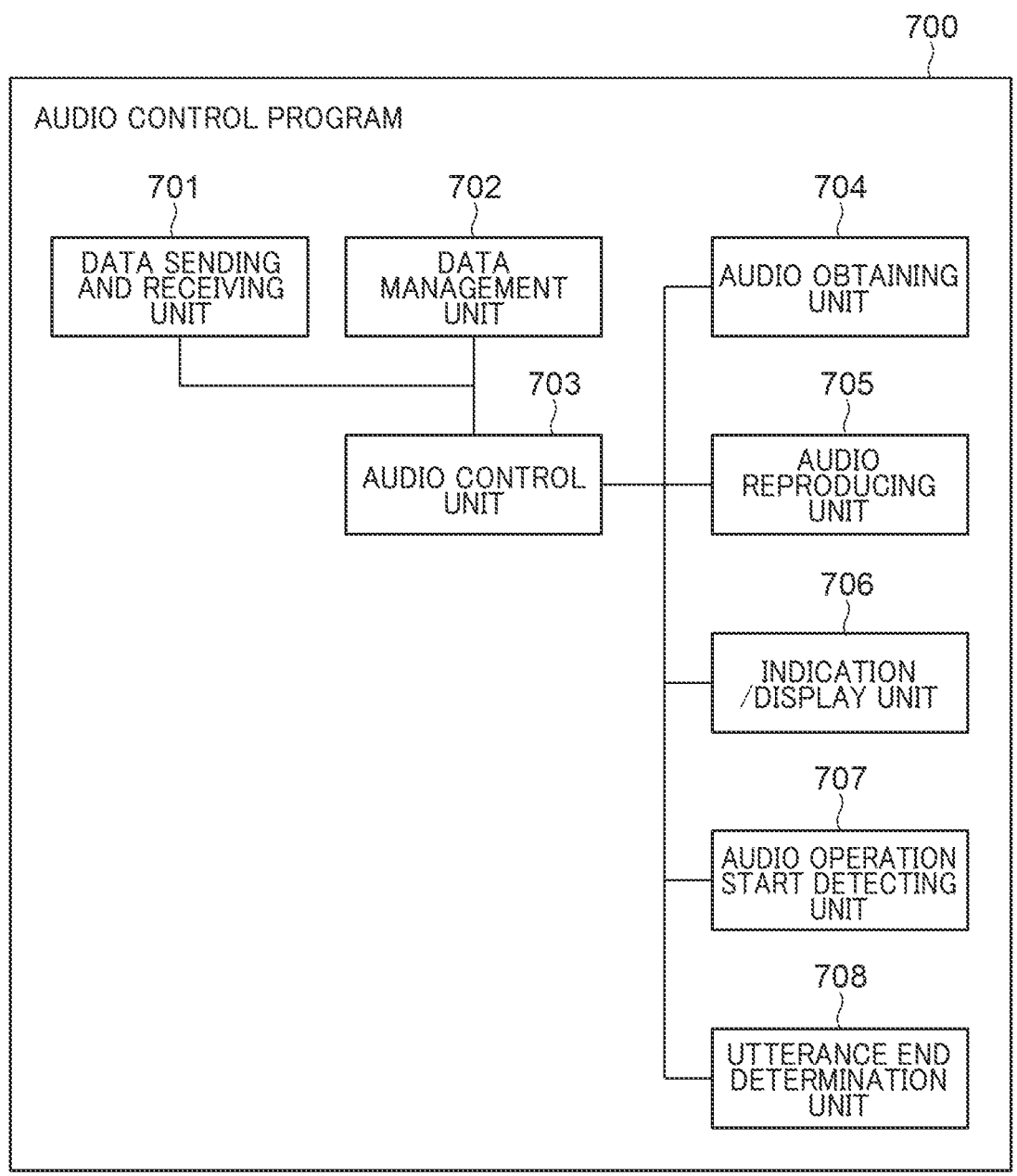
FIG. 7 is a block diagram showing a functional arrangement of an audio control program that is executed in the smart speaker.

FIG. 7 is a block diagram showing a functional arrangement of an audio control program 700 that is executed in the smart speaker 102.

The audio control program 700 for the smart speaker 102 is stored in the storage 305 as described above. At startup, the CPU 302 develops the audio control program 700 on the RAM 303 and executes the same.

The audio control program 700 has a data sending and receiving unit 701, a data management unit 702, an audio control unit 703, an audio obtaining unit 704, an audio reproducing unit 705, an indication unit 706 (a display unit 706), an audio operation start detecting unit 707, and an utterance end determination unit 708. As shown in FIG. 7, the audio control unit 703 is connected to all of the other modules of the audio control program 700.

The data sending and receiving unit 701 sends and receives data to and from other apparatuses on the network 104 using TCP/IP via the network I/F 306. The data sending and receiving unit 701 also sends and receives data to and from the cloud server 103 via the gateway 105 on the network 104. Specifically, for example, the data sending and receiving unit 701 sends audio data of voice uttered by the user 107, which is obtained by the audio obtaining unit 704 (described later), to the cloud server 103, and receives audio synthesis data generated on the cloud server 103, which is a response to the user 107.

The data management unit 702 stores various types of data such as work data, which is generated during execution of the audio control program 700, in predetermined areas on the storage 305 and manages them. For example, the data management unit 702 stores and manages audio volume setting data on audio reproduced by the audio reproducing unit 705 (described later), authentication information required for communication with the gateway 105, respective device information, which are required for communication with the MFP 101 and the cloud server 103, and so forth.

The audio obtaining unit 704 converts analog audio, uttered by the user 107 near the smart speaker 102 and obtained by the microphone 308, into audio data and temporarily stores the audio data. The audio of the user 107 is converted into a predetermined format such as MP3 and temporarily stored on the RAM 303 as coded audio data that will be sent to the cloud server 103. The audio control unit 703 manages the processing start/end timing of the audio obtaining unit 704. The audio data may be coded (converted) into a format for universal streaming, and the coded audio data may be successively sent by the data sending and receiving unit 701.

The audio reproducing unit 705 reproduces audio synthesis data (audio message), which is received by the data sending and receiving unit 701, through the speaker 310 via the audio controller 309. The audio control unit 703 manages the audio reproduction timing of the audio reproducing unit 705.

The indication unit 706 controls indication of the LED 312 via the indication controller 311. For example, when the audio operation start detecting unit 707 has detected an audio operation, the indication unit 706 performs control to turn on the LED 312. The audio control unit 703 manages the indication timing of the indication unit 706.

The audio operation start detecting unit 707 detects a wake word uttered by the user 107 or a depression of an operation start key (not shown) of the smart speaker 102 and sends an operation start notification to the audio control unit 703. Here, the wake word means an audio word determined in advance. The audio operation start detecting unit 707 constantly detects the wake word from analog voice of the user 107 near the smart speaker 102, which is obtained through the microphone 308. The user 107 can operate the MFP 101 by uttering the wake word and then uttering what he/she wants to do. Audio processing performed after the audio operation start detecting unit 707 detects the wake word will be described later.

The utterance end determination unit 708 determines whether or not it is a timing of the end of processing by the audio obtaining unit 704. For example, when the user 107 does not utter voice for a predetermined time period (for example, three seconds), the utterance end determination unit 708 determines that the utterance of user 107 has ended, and sends an utterance end notification to the audio control unit 703. It should be noted that the end of the utterance may be determined based on a predetermined word uttered by the user 107 (for example, "Yes", "No", "Ok", "Cancel", "End", "Start"), instead of the length of time that there is no utterance (hereafter referred to as the blank period). In this case, the utterance end determination unit 708 may determine that the utterance has ended, without waiting for the lapse of the predetermined time period, when the user 107 utters the predetermined word. The end of the utterance may also be determined by the cloud server 103, not by the smart speaker 102. In this case, the cloud server 103 may determine that the utterance has ended based on the meaning or context of what is uttered by the user 107.

The audio control unit 703, which is the center of control, controls the other modules in the audio control program 700 such that they can operate in conjunction with one another. Specifically, the audio control unit 703 controls the start/end of processing of the audio obtaining unit 704, the audio reproducing unit 705, and the indication unit 706. The audio control unit 703 also performs control such that after the audio obtaining unit 704 obtains audio data, the data sending and receiving unit 701 sends the audio data to the cloud server 103. The audio control unit 703 also performs control such that after the data sending and receiving unit 701 receives audio synthesis data from the cloud server 103, the audio reproducing unit 705 reproduces the audio synthesis data.

A description will now be given of start/end timings of processes of the audio obtaining unit 704, the audio reproducing unit 705, and the indication unit 706.

Upon receiving the operation start notification from the audio operation start detecting unit 707, the audio control unit 703 causes the audio obtaining unit 704 to start processing. Also, upon receiving the utterance end notification from the utterance end determination unit 708, the audio control unit 703 causes the audio obtaining unit 704 to end processing. For example, assume that the user 107 utters the wake word and subsequently utters "I want to make a copy." At this time, the audio operation start detecting unit 707 detects analog audio of the wake word and sends the operation start notification to the audio control unit 703. Upon receiving the operation start notification, the audio control unit 703 causes the audio obtaining unit 704 to start processing. The audio obtaining unit 704 obtains analog audio of "I want to make a copy" that was subsequently uttered, converts the analog audio into audio data, and temporarily stores the audio data. Upon determining that there has been a predetermined blank period since the user 107 uttered "I want to make a copy", the utterance end determination unit 708 sends the utterance end notification to the audio control unit 703. Upon receiving the utterance end notification, the audio control unit 703 causes the audio obtaining unit 704 to end processing. In the following description, a state of the smart speaker 102 from the start to end of processing by the audio obtaining unit 704 is referred to as the "utterance processing state". The indication unit 706 makes the LED 312 stay on while the smart speaker 102 is in the utterance processing state.

After the utterance end notification is sent from the utterance end determination unit 708, an interactive session with the cloud server 103 starts. Specifically, the audio control unit 703 reads out audio data temporarily stored by the audio obtaining unit 704, controls the data sending and receiving unit 701 to send the audio data to the cloud server 103, and then waits for a response from the cloud server 103. The response from the cloud server 103 is, for example, a response message comprised of a header part indicating that this is a response and synthetic audio data. Upon receiving the response message through the data sending and receiving unit 701, the audio control unit 703 controls the audio reproducing unit 705 to reproduce the audio synthesis data as response processing. The audio synthesis data is, for example, "Copy screen will be displayed". In the following description, a state of the smart speaker 102 from the determination, of the end of the utterance, by the utterance end determination unit 708 to the end of reproduction of the audio synthesis data by the audio reproducing unit 705 is referred to as the response processing state of the smart speaker 102. While the smart speaker 102 is in the response processing state, the indication unit 706 blinks the LED 312.

While the interactive session with the cloud server 103 is continuing after the response processing, the user 107 is allowed to subsequently uttering what he/she wants to do without uttering the wake word. Upon determining that the interactive session has ended, the cloud server 103 sends an interactive session end notification to the smart speaker 102. Upon receiving the interactive session end notification, the audio control unit 703 ends the interactive session with the cloud server 103. In the following description, a state of the smart speaker 102 from the end of the interactive session to the start of the next interactive session is referred to as the standby state of the smart speaker 102. A state of the smart speaker 102 until the smart speaker 102 receives the operation start notification from the audio operation start detecting unit 707 is referred to as the constant standby state of the smart speaker 102. While the smart speaker 102 is in the standby state or the constant standby state, the indication unit 706 makes the LED 312 stay off.

<Functional Arrangement of an Audio Data Conversion Control Program for a Cloud Server>

Figure 8:
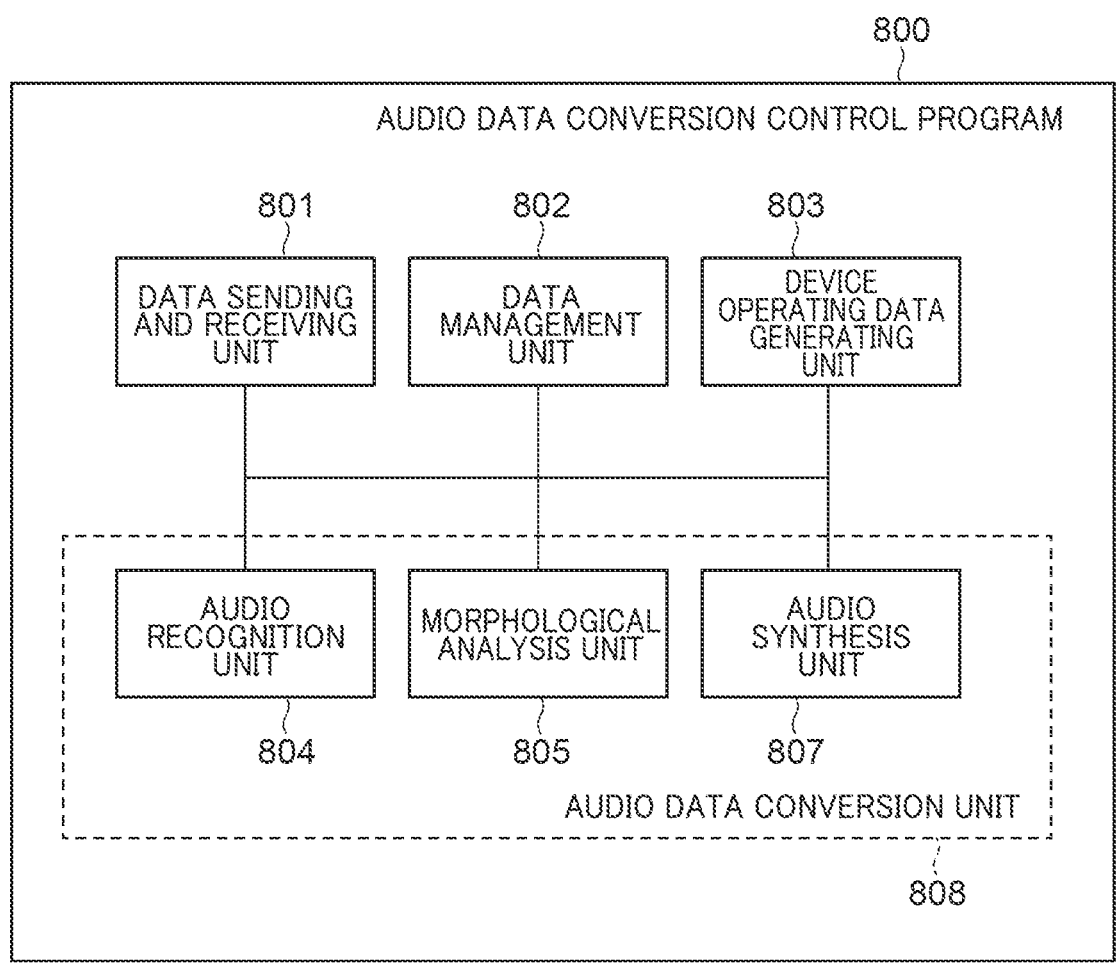
FIG. 8 is a block diagram showing a functional arrangement of an audio data conversion control program that is executed in the cloud server.

FIG. 8 is a block diagram showing a functional arrangement of an audio data conversion control program 800 that is executed in the cloud server 103.

The audio data conversion control program 800 for the cloud server 103 is stored in the storage 405 as described earlier, and at startup, the CPU 402 develops the audio data conversion control program 800 on the RAM 403 and executes the same.

The audio data conversion control program 800 has a data sending and receiving unit 801, a data management unit 802, a device operating data generating unit 803, and an audio data conversion unit 808. The audio data conversion unit 808 has an audio recognition unit 804, a morphological analysis unit 805, and an audio synthesis unit 807. As shown in FIG. 8, the modules of the audio data conversion control program 800 are connected to one another.

The data sending and receiving unit 801 sends and receives data to and from other apparatuses on the network 104 using TCP/IP via the network I/F 406 and the gateway 105. Specifically, for example, the data sending and receiving unit 801 receives audio data of voice uttered by the user 107 from the smart speaker 102 and sends text data determination results generated in an audio recognition process by the audio recognition unit 804.

The data management unit 802 stores a variety of data such as work data generated during execution of the audio data conversion control program 800, and parameters required for the audio recognition process by the audio recognition unit 804, in predetermined areas on the storage 405 and manages them. For example, the data management unit 802 stores an acoustic model and a language model, which are for the audio recognition unit 804 to convert audio data received by the data sending and receiving unit 801 into text data, in predetermined areas on the storage 405 and manages them. The data management unit 802 also stores a dictionary, which is for the morphological analysis unit 805 to perform morphological analysis of text data, in a predetermined area on the storage 405 and manages the same. The data management unit 802 stores an audio database, which is for the audio synthesis unit 807 to synthesize audio, in predetermined areas on the storage 405 and manages the same. The data management unit 802 stores device information required to communicate with the smart speaker 102 and the MFP 101, and the like, in predetermined areas on the storage 405 and manages the same.

The device operating data generating unit 803 generates device operating data based on a result of morphological analysis on audio recognition data output from the audio data conversion unit 808.

When audio data of voice uttered by the user 107 and received by the data sending and receiving unit 801 is input from the data sending and receiving unit 801, the audio recognition unit 804 carries out an audio recognition process for converting the input audio data into audio recognition data that is text data. In the audio recognition process, the input audio data is converted into phonemes using an acoustic model, and then the phonemes are converted into actual text data using a language model. It should be noted that the input audio data may be in a plurality of languages. Accordingly, a first audio recognition method, in which a language of the input audio data is determined, and the audio data is converted into text data according to the language, may be used for the audio recognition process. Also, a second audio recognition method, in which the input audio data is converted into phonemes using acoustic models for the plurality of languages, and the phonemes are converted into text data in the respective languages using corresponding language models and then output them, may be used for the audio recognition process. When the second audio recognition method is used, the audio data is converted into text data in a plurality of languages, and hence the audio recognition unit 804 outputs audio recognition data comprised of the text data and their language settings as an audio recognition result.

In the present embodiment, the input audio data is in Japanese and English. Audio recognition data in Japanese is comprised of text data consisting of one or more kana and its language setting "Japanese". The audio recognition data in English is comprised of text data consisting of one or more alphabets and its language setting "English". Notes that other methods may be used for the audio recognition process in which audio data is converted into audio recognition data, and the audio recognition method is not limited to those described above. The details of the audio recognition process are not the gist, and hence further descriptions thereof are omitted.

The morphological analysis unit 805 performs morphological analysis on audio recognition data, which is obtained as a result of conversion by the audio recognition unit 804, according to its language settings. The morphological analysis derives morpheme columns from a dictionary including information such as the grammar of the language and parts of speech and further determines parts of speech of each morpheme. The morphological analysis unit 805 can be implemented using well-known morphological analysis software such as JUMAN, ChaSen, and MeCab. The morphological analysis software is a well-known technique, and therefore detailed description thereof is omitted.

The audio synthesis unit 807 generates audio synthesis data for providing various notifications to the user 107. The audio synthesis data is sent to the smart speaker 102 via the data sending and receiving unit 801.

<Functional Arrangement of a Print Data Control Program for a Print Server>

Figure 9:
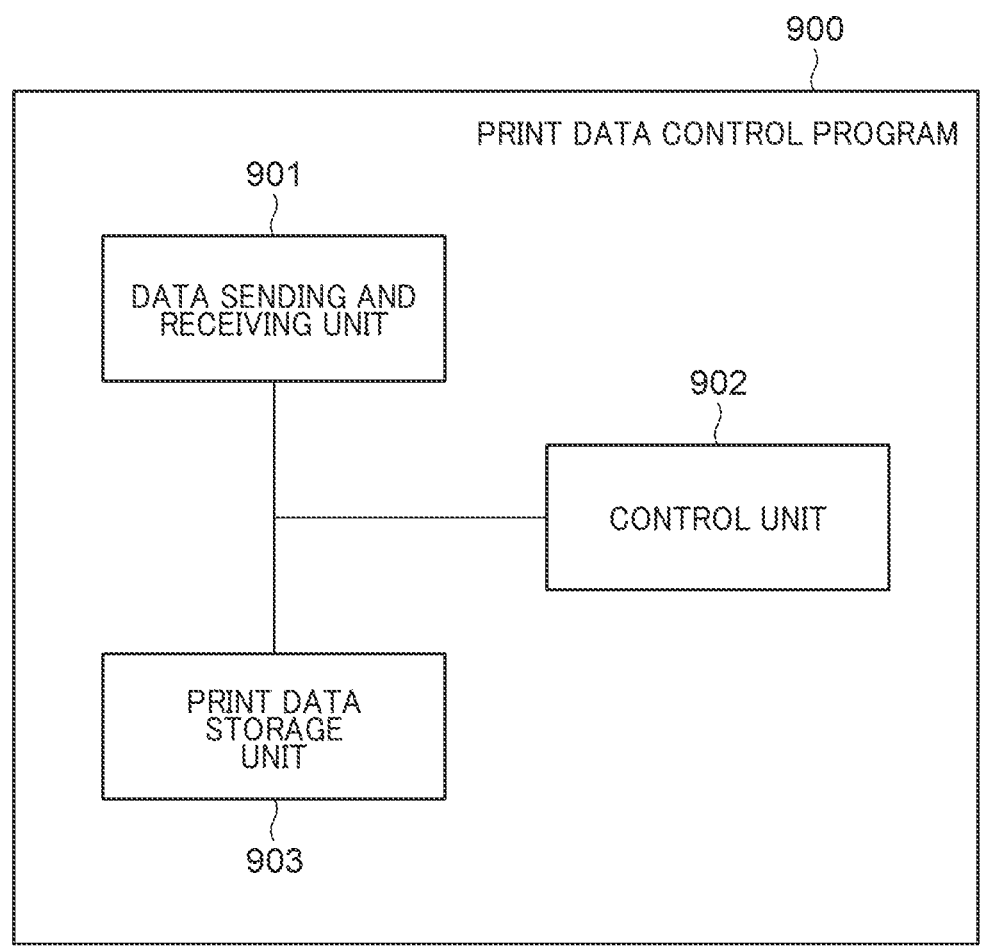
FIG. 9 is a block diagram showing a functional arrangement of a print data control program that is executed in the print server.

FIG. 9 is a block diagram showing a functional arrangement of a print data control program 900 that is executed in the print server 106.

The print data control program 900 for the print server 106 is stored in the storage 505 as described earlier, and at startup, the CPU 502 develops the print data control program 900 on the RAM 503 and execute the same.

The print data control program 900 has a data sending and receiving unit 901, a control unit 902, and a print data storage unit 903. As shown in FIG. 9, the modules of the print data control program 900 are connected to one another.

The data sending and receiving unit 901 sends and receives data to and from other apparatuses on the network 104 using TCP/IP via the network I/F 506. The data sending and receiving unit 901 receives a job list receiving command from the MFP 101.

The control unit 902 is a central processing unit for controlling the print server 106. Processing associated with the functions of the print server 106 is implemented by the control unit 902 performing the processing based on programs stored in the print data storage unit 903.

The print data storage unit 903, which is a storage device such as a hard disk or SSD, stores various programs, print jobs, and so forth. The print data storage unit 903 also acts as an auxiliary storage device for the control unit 902.

<Control Sequence Executed when a User Input Audio into a Smart Speaker not-Located Near an MFP>

Figure 10:
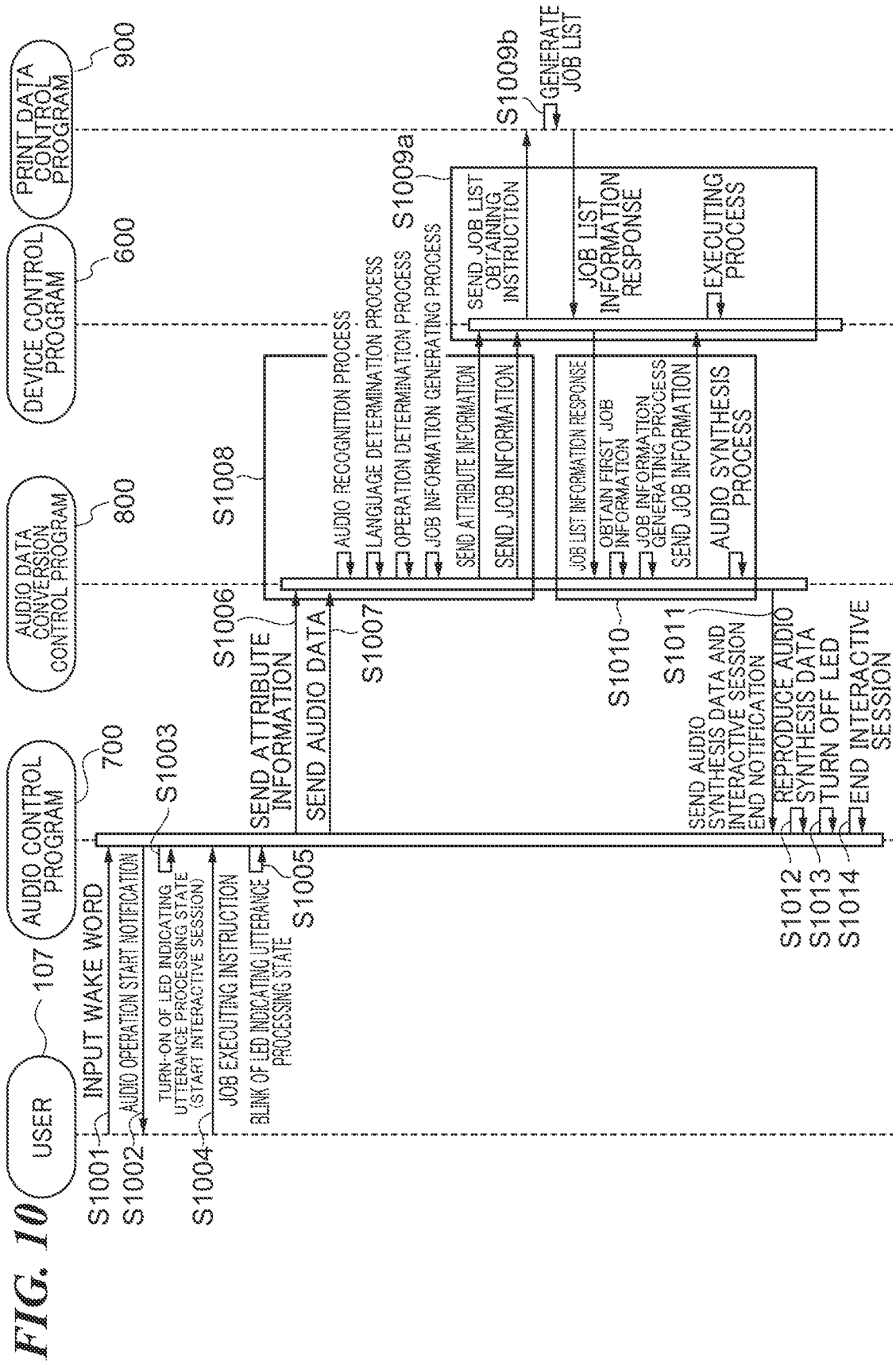
FIG. 10 is a sequence diagram showing exchanges among control programs executed by the apparatuses constituting the information processing system in the embodiment 1 when the smart speaker is not located near the MFP.

FIG. 10 is a sequence diagram showing exchanges among the control programs executed by the apparatuses constituting the information processing system in the embodiment 1 when the smart speaker 102 is not located near the MFP 101.

It is assumed that in the sequence in FIG. 10, the smart speaker 102, the MFP 101, the cloud server 103, and the print server 106 are in a state of being able to communicate with one another. It is also assumed that the MFP 101 is in a state where a home screen is displayed, through which functions such as copying, scanning, printing, and faxing can be called after the start-up by turning-on the power.

First, in step S1001, when the audio operation start detecting unit 707 of the audio control program 700 detects an audio operation starting instruction being issued to the smart speaker 102 by the user 107, the process proceeds to step S1002. The audio operation starting instruction is issued by the user 107 uttering (inputting) the wake word toward the microphone 308 of the smart speaker 102 or depressing the operation start key of the smart speaker 102.

In step S1002, the audio reproducing unit 705 of the audio control program 700 reproduces synthetic audio data for providing notification of the starting state and notifies the user 107 of that an audio operation has been started.

In step S1003, the indication unit 706 of the audio control program 700 turns on the LED 312 to indicate that smart speaker 102 has entered the utterance processing state (started an interactive session). At the same time, the audio obtaining unit 704 starts processing.

In step S1004, when a predetermined blank period has elapsed since the time when the audio obtaining unit 704 of the audio control program 700 detected a job executing instruction issued to the smart speaker 102 by the user 107, and the utterance end determination unit 708 determines that the utterance has ended, the process proceeds to step S1005. Here, the job executing instruction means data obtained by the audio obtaining unit 704 converting, into digital audio data, analog voice such as "Print today's documents" and "Tell me the remaining amount of toner" uttered by the user 107 subsequently to the input of the wake word in the step S1001.

In the step S1005, the indication unit 706 of the audio control program 700 blinks the LED 312 to indicate that it is determined that the utterance has ended and that the smart speaker 102 has entered the response processing state. At the same time, the audio obtaining unit 704 ends the processing.

In step S1006, the data sending and receiving unit 701 (first attribute information notification means) of the audio control program 700 sends attribute information held in the data management unit 702 of the audio control program 700 to the cloud server 103. In this process, the attribute information means information indicating whether or not the MFP 101 is equipped with the smart speaker 102. It should be noted that in the example shown in FIG. 10, the attribute information indicating that the MFP 101 is not equipped with the smart speaker 102 is sent to the cloud server 103.

In step S1007, the data sending and receiving unit 701 (job notification means) of the audio control program 700 sends the job executing instruction detected in the step S1004 to the cloud server 103.

In step S1008, the cloud server 103 carries out a process according to the attribute information and the audio data received by the data sending and receiving unit 801 of the audio data conversion control program 800.

In steps S1009a and S1009b, the device control program 600 of the MFP 101 and the print data control program 900 of the print server 106 collaborate with each other to carry out a process according to attribute information and job information received from the cloud server 103. In this process, a job list information response including information about a job list generated by the print server 106 is sent from the MFP 101 to the cloud server 103 (detailed description will be given later).

In step S1010, in the cloud server 103, the audio synthesis unit 807 of the audio data conversion control program 800 carries out a process according to the job list information response received from the MFP 101 to generate audio synthesis data. Details of the steps S1008, S1010, and S1009a will be given later with reference to flowcharts in FIGS. 11, 12, and 13.

In step S1011, the data sending and receiving unit 801 sends, to the smart speaker 102, the audio synthesis data generated in the step S1010, and an interactive session end notification which notifies for causing to end the interactive session with the user 107.

In step S1012, the audio reproducing unit 705 reproduces the audio synthesis data received in the step S1011. As a result, for example, audio synthesis data "Today's most recent file will be printed" generated in the step S1010 is reproduced through the speaker 310.

In step S1013, in response to the interactive session end notification sent from the cloud server 103 in the step S1011, the indication unit 706 of the audio control program 700 turns off the LED 312 to indicate that the smart speaker 102 has entered the standby state.

In step S1014, in response to the interactive session end notification sent from the cloud server 103 in the step S1011, the audio control unit 703 of the audio control program 700 ends the interactive session with the cloud server 103. As a result, the smart speaker 102 shifts to the standby state.

It should be noted that in the sequence in FIG. 10, the smart speaker 102 is in the response processing state. Namely, even when the LED 312 is blinking, the wake word can always be input. Thus, the user 107 can forcefully stop the interactive session by uttering "Cancel", "Stop", or the like subsequently to utterance of the wake word.

<Flowchart of the Process in the Step S1008 in FIG. 10 in a Cloud Server>

Figure 11:
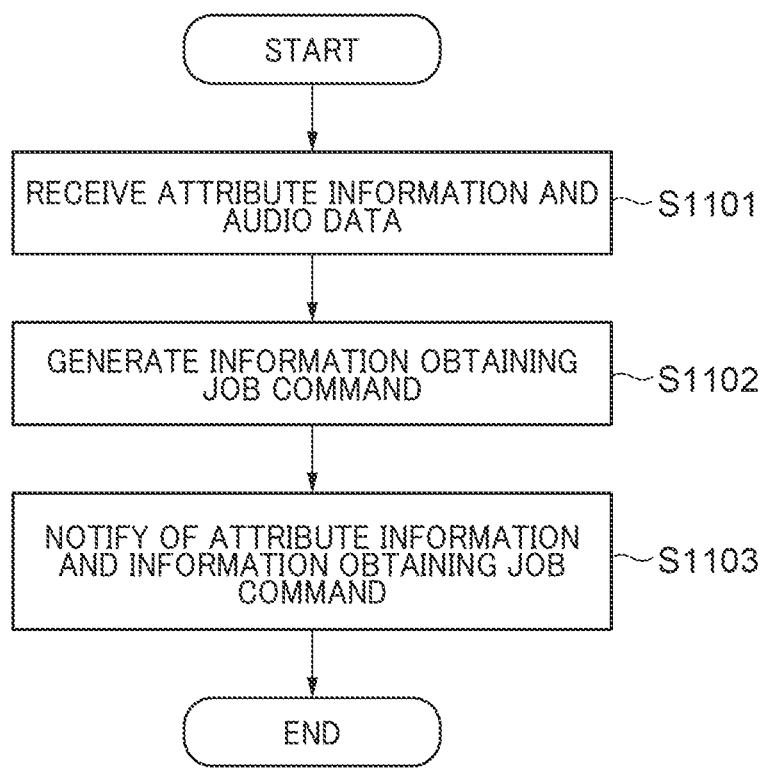
FIG. 11 is a flowchart of a process in step S1008 in FIG. 10.

FIG. 11 is a flowchart of the process in the step S1008 in FIG. 10, that is, a detailed flowchart of the process carried out in the cloud server 103 according to attribute information and audio data received by the data sending and receiving unit 801 of the audio data conversion control program 800.

In step S1101, the CPU 402 causes the data sending and receiving unit 801 to receive attribute information and audio data sent from the smart speaker 102.

In step S1102, the CPU 402 (query notification means) generates an information obtaining job command to be sent to the MFP 101, from the audio data received in the step S1101. Specifically, first, the audio recognition unit 804 of the audio data conversion control program 800 converts the audio data into phonemes. Next, the audio recognition unit 804 determines a language of the audio data and converts the phonemes into text data using a language model for the determined language. Then, the morphological analysis unit 805 of the audio data conversion control program 800 performs morphological analysis on the text data to determine what operation was ordered by the user 107. After that, based on the determination result, the device operation data generating unit 803 of the audio data conversion control program 800 generates an information obtaining job command (job information: device operating data).

For example, when the job executing instruction issued from the user 107 to the smart speaker 102 using audio is an instruction "Please print today's documents", the device operating data generating unit 803 generates a print job list obtaining command as the information obtaining job command. Specifically, first, the device operation data generating unit 803 extracts a keyword, which is used to search print data managed by the print server 106, from the audio. Then, the device operation data generating unit 803 generates a print job list obtaining command for querying a print job retrieved using the keyword from the print server 106. It should be noted that the print job list obtaining command is an example of the information obtaining job command, and the information obtaining job command is not limited to this. For example, a fax job list obtaining command for querying the MFP 101 for a fax job in the storage 205 according to the job executing instruction issued from the user 107 to the smart speaker 102 may be generated as the information obtaining job command. It should be noted that in the present embodiment, the fax job means a job in which received fax data is printed.

In step S1103, the CPU 402 (second attribute information notification means) notifies the MFP 101 of the attribute information received in the step S1101 and the information obtaining job command generated in the step S1102.

<Flowchart of the Process in the Step S1010 in FIG. 10 in a Cloud Server>

Figure 12:
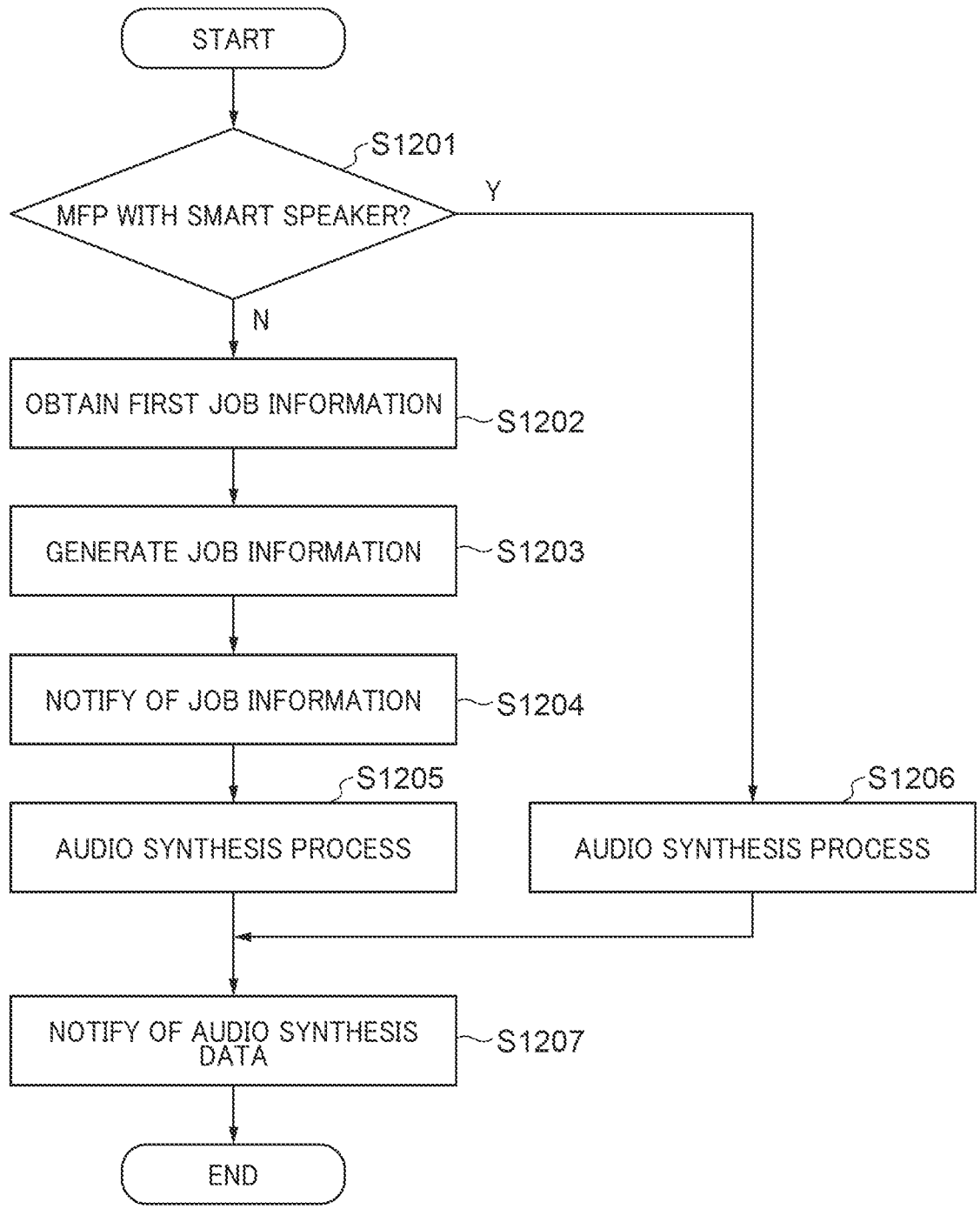
FIG. 12 is a flowchart of a process in step S1010 in FIG. 10.

FIG. 12 is a flowchart of the process in step S1010 in FIG. 10, namely, the process that is carried out, in the cloud server 103, by the audio synthesis unit 807 of the audio date conversion control program 800 according to the job list information response received from the MFP 101.

In step S1201, the CPU 402 (control change means) refers to the attribute information received in the step S1101 and determines whether or not the MFP 101 is equipped with the smart speaker 102. When the MFP 101 is not equipped with the smart speaker 102 (NO in the step S1201), the CPU 402 determines that the smart speaker 102 is not near the MFP 101, followed by the process proceeding to step S1202. On the other hand, when the MFP 101 is equipped with the smart speaker 102 (YES in the step S1201), the CPU 402 determines that the smart speaker 102 is located near the MFP 101, followed by the process proceeding to step S1206.

In the step S1201, the CPU 402 obtains information on a first job in a job list (hereafter referred to as "first job information") included in the job list information response sent from the MFP 101.

In step S1203, the CPU 402 generates job information based on the first job information obtained in the step S1202. Here, a print job command, a fax job command, or the like is generated according to the first job information.

In step S1204, the CPU 402 notifies the MFP 101 of the job information generated in the step S1203. The job control unit 603 of the device control program 600 carries out a job executing process according to the job information (step S1009a). It should be noted that when the job information notified of to the MFP 101 here is a job command using another function other than the fax function and the print function which the MFP 101 has, the CPU 402 notifies of the attribute information received in the step S1101 again.

In step S1205, the CPU 402 carries out an audio synthesis process for generating audio synthesis data for notifying the user 107 of that the print job command is notified of to the MFP 101. For example, the CPU 402 generates the audio synthesis data comprised of a message such as "The most recent file among files with today's date has been printed". Then, in step S1207, the CPU 402 notifies the smart speaker 102 of the audio synthesis data generated in the step S1205, and ends the present process.

In the step S1206, the CPU 402 carries out an audio synthesis process for generating audio synthesis data according to processing. For example, the CPU 402 generates the audio synthesis data comprised of a message such as "Please select a file to print from files with today's date on the operating panel" so as to notify the user 107 that the job list has been displayed on the operating panel 209 of the MFP 101. Then, in the step S1207, the CPU 402 notifies the smart speaker 102 of the audio synthesis data generated in the step S1206, and ends the present process.

<Flowchart of the Process in the Step S1009a in FIG. 10 in an MFP>

Figure 13:
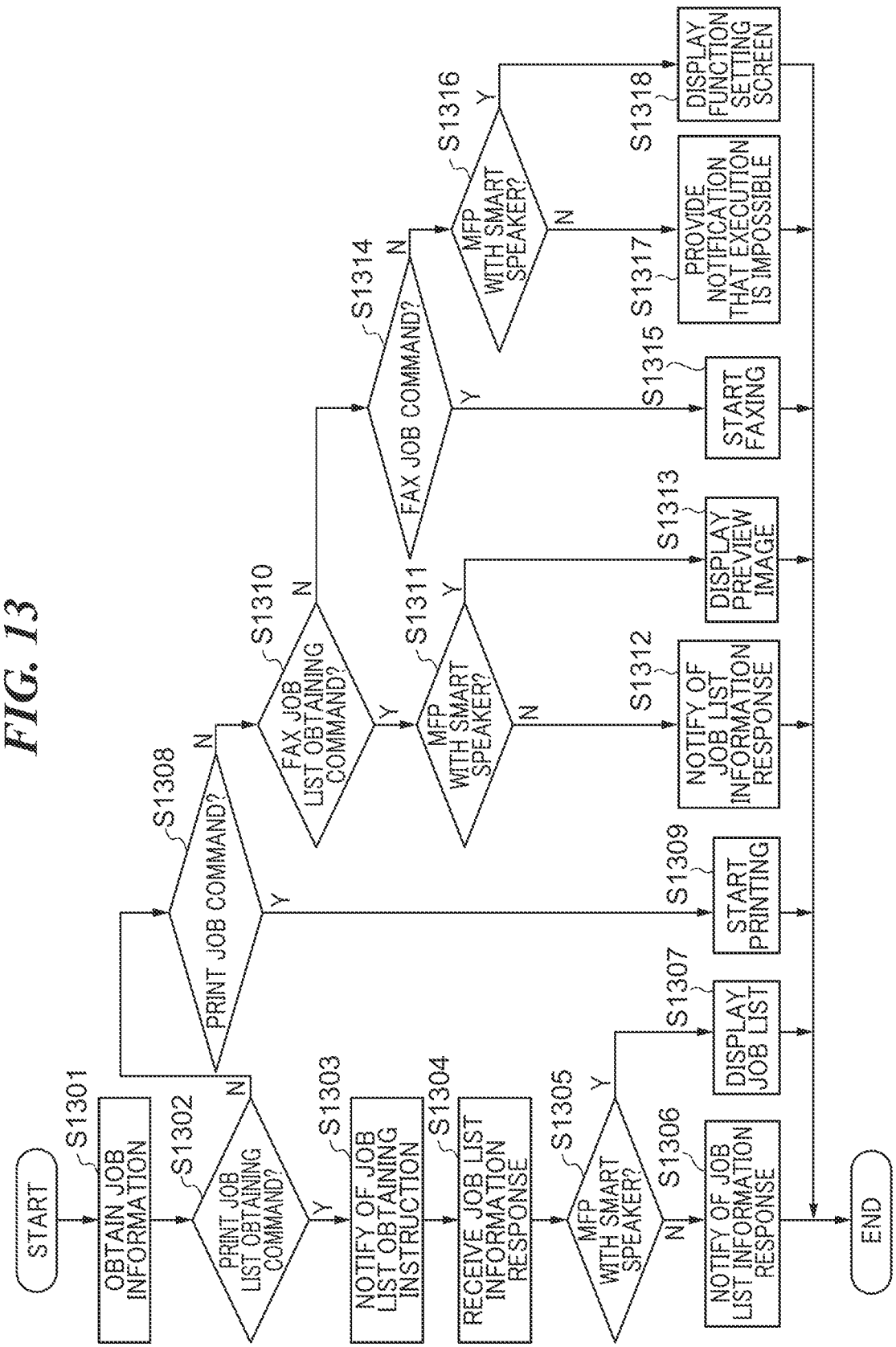
FIG. 13 is a flowchart of a process in step S1009a in FIG. 10.

FIG. 13 is a flowchart showing the details of the process in the step S1009a in FIG. 10, namely, the process that is carried out whenever the data sending and receiving unit 601 of the device control program 600 in the MFP 101 receives job information.

In step S1301, the CPU 202 receives job information from the cloud server 103.

In step S1302, the CPU 202 determines whether or not the job information received in the step S1301 is a print job list obtaining command for querying a print job. When the job information is the print job list obtaining command (YES in the step S1302), the process proceeds to step S1303, and when the job information is another command (NO in the step S1302), the process proceeds to step S1308.

In the step S1303, the CPU 202 (print job list obtaining means) notifies the print server 106 of a job list obtaining instruction that queries a job list for a concerned job, according to the print job list obtaining command received in the step S1301. In response to the job list obtaining instruction, the print server 106 generates a job list (the step S1009b in FIG. 10) and sends a job list information response including the generated job list, to the MFP 101.

In step S1304, the CPU 202 receives the job list information response from the print server 106.

In step S1305, based on attribute information (the step S1103 in FIG. 11) sent together with the print job list obtaining command (information obtaining job command), the CPU 202 determines whether or not the MFP 101 is equipped with the smart speaker 102. When the MFP 101 is not equipped with the smart speaker 102 (NO in the step S1305), the process proceeds to step S1306, and when the MFP 101 is equipped with the smart speaker 102 (YES in the step S1305), the process proceeds to step S1307.

In the step S1306, the CPU 202 (response sending means) notifies the cloud server 103 of the job list information response (command response) obtained from the print server 106 in the step S1304, and ends the present process.

In the step S1307, the CPU 202 (display means) displays a job list, which is included in the job list information response obtained in the step S1304, on the operating panel 209, and ends the present process.

In the step S1308, the CPU 202 determines whether or not the job information received in the step S1301 is a print job command. When the job information is the print job command (YES in the step S1308), the process proceeds to step S1309, and when the job information is not the print job command (NO in the step S1308), the process proceeds to step S1310.

In the step S1309, the CPU 202 starts to carry out a printing process according to the print job command received in the step S1301, and ends the present process.

In the step S1310, the CPU 202 determines whether or not the job information received in the step S1301 is a fax job list obtaining command for querying a fax job. When the job information is the fax job list obtaining command (YES in the step S1310), the process proceeds to step S1311, and when the job information is not the fax job list obtaining command (NO in the step S1310), the process proceeds to step S1314.

In the step S1311, based on attribute information (the step S1103 in FIG. 11) sent together with the print job list obtaining command (information obtaining job command), the CPU 202 determines whether or not the MFP 101 is equipped with the smart speaker 102. When the MFP 101 is not equipped with the smart speaker 102 (NO in the step S1311), the process proceeds to step S1312, and when the MFP 101 is equipped with the smart speaker 102 (YES in the step S1311), the process proceeds to step S1313.

In the step S1312, the CPU 202 (job list generating means) generates a job list from a fax job(s) held in the storage 205, notifies the cloud server 103 of a job list information response including the generated job list, and ends the present process.

In the step S1313, the CPU 202 generates a preview image(s) of received fax data, which is/are targeted for printing in the fax jobs held in the storage 205, displays a list of the generated preview images on the operating panel 209, and ends the present process.

In the step S1314, the CPU 202 determines whether or not the job information obtained in the step S1301 is a fax job command. When the job information is the fax job command (YES in the step S1314), the process proceeds to step S1315, and when the job information is another command for executing a function other than the fax function and the print function which the MFP 101 has (NO in the step S1314), the process proceeds to step S1316.

In the step S1315, according to the fax job command received in the step S1301, the CPU 202 starts to carry out a fax process for reading and printing the fax data held in the storage 205, and ends the present process.

In the step S1316, based on attribute information (refer to the step S1204 in FIG. 12) sent together with the other job command received in the step S1301, the CPU 202 determines whether or not the MFP 101 is equipped with the smart speaker 102. When the MFP 101 is not equipped with the smart speaker 102 (NO in the step S1316), the process proceeds to step S1317, and when the MFP 101 is equipped with the smart speaker 102 (YES in the step S1316), the process proceeds to step S1318.

In the step S1317, the CPU 202 notifies the user 107 of that a processing corresponding to the received other job command cannot be executed, by audio through the smart speaker 102, and ends the present process.

In the step S1318, the CPU 202 displays a function setting screen for executing a processing corresponding to the received other job, on the operating panel 209, and ends the present process.

<Control Sequence Executed when a User Input Audio into a Smart Speaker Located Near an MFP>

Figure 20:
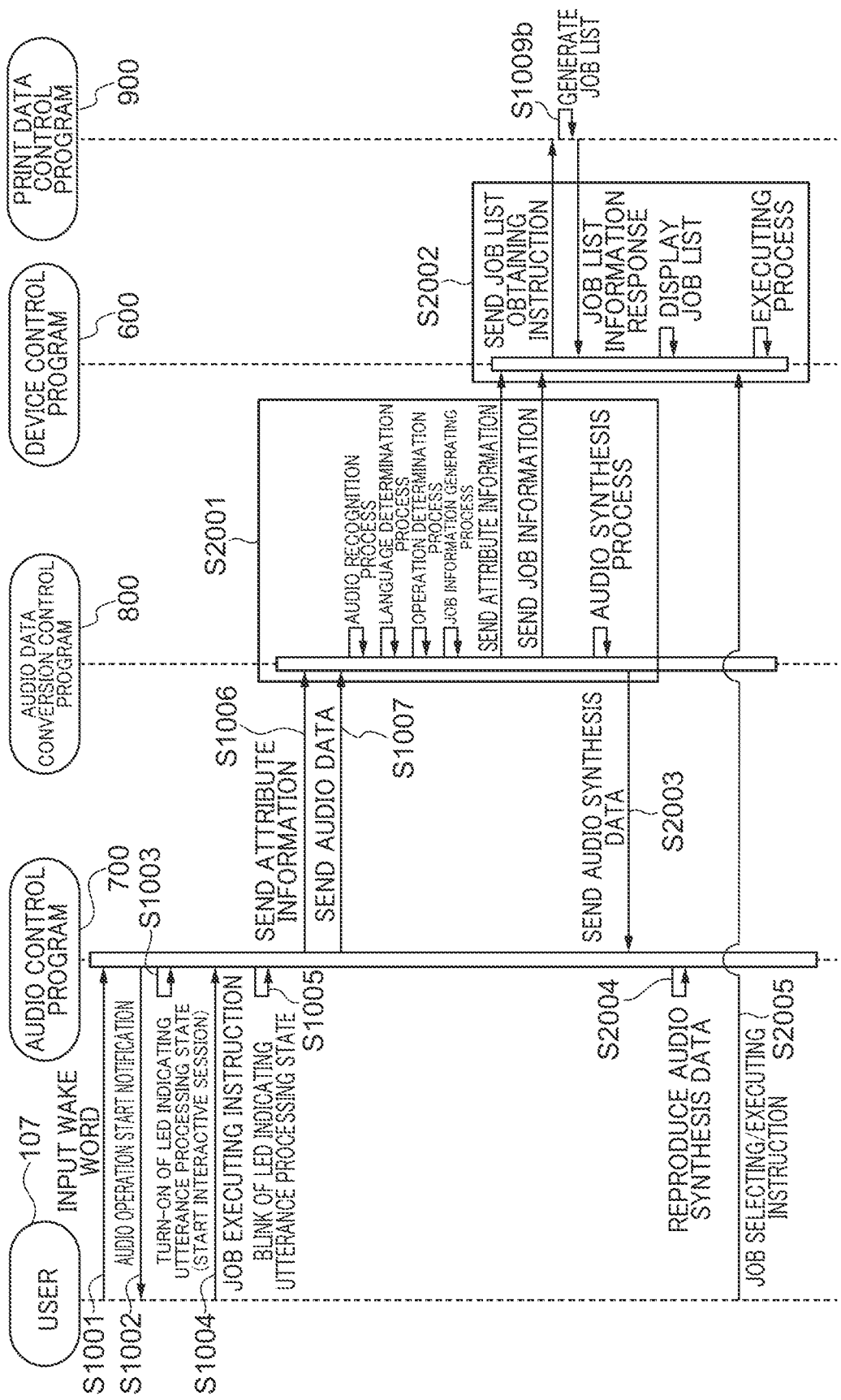
FIG. 20 is a sequence diagram showing data exchanges among control programs executed by the apparatuses constituting the information processing system in the embodiment 1 when the smart speaker is located near the MFP.

FIG. 20 is a sequence diagram showing data exchanges among the control programs executed by the apparatuses constituting the information processing system in the embodiment 1 when the smart speaker 102 is located near the MFP 101.

It is assumed that in the sequence in FIG. 20, the smart speaker 102, the MFP 101 located in vicinity of the smart speaker 102, the cloud server 103, and the print server 106 are in a state of being able to communicate with one another. It is also assumed that the MFP 101 is displaying a home screen through which functions such as copying, scanning, printing, and faxing can be called after the start-up by turning-on the power.

Only steps in the sequence of FIG. 20 differing from those in the sequence of FIG. 10 will now be described. Specifically, in the sequence of FIG. 20, step S2001 is executed in place of the steps S1008 and S1010 in FIG. 10, step S2002 is executed in place of the step S1009a in FIG. 10, and step S2003 is executed in place of the step S1011 in FIG. 10. Additionally, in the sequence of FIG. 20, in place of the steps S1012 to S1014 in FIG. 10, step S2004 is executed, and step S2005 is also executed.

The other steps in FIG. 20 are the same as those in FIG. 10, and hence they are designated by the same reference symbols, the same descriptions therefor are omitted.

In the present sequence, first, the steps S1001 to S1007 described above with reference to FIG. 10 are executed, and then the process proceeds to the step S2001.

In the step S2001, in the cloud server 103, the audio data conversion unit 808 carries out a process according to attribute information and audio data received by the data sending and receiving unit 801 of the audio data conversion control program 800. Details of this process are substantially the same as in the flowchart of FIG. 11. In the present process, however, after the process in the step S1003, the process in the step S1206 in FIG. 12 is carried out to generate audio synthesis data according to processing, and then the present process is ended.

In the steps S2002 and S1009b, the device control program 600 of the MFP 101 and the print data control program 900 of the print server 106 collaborate with each other to carry out a process according to the attribute information and the job information received from the cloud server 103. Details of this process are substantially the same as in the flowchart of FIG. 13. In the present process, however, the process proceeds from the step S1304 directly to the step S1307, and in a case of YES in the step S1310, the process proceeds directly to the step S1313 to display a job list on the operating panel 209 of the MFP 101, and then the present process is ended. An executing instruction such as one issued in the steps S1308 and S1314 is issued by the user 107 operating the operating panel 209 of the MFP 101 in the step S2005. Thus, in a case of NO in the step S1302, the process proceeds directly to the step S1310, and in a case of NO in the step S1310, the present process is ended without any further processing.

In the step S2003, the data sending and receiving unit 801 sends the audio synthesis data generated in the step S2001 to the smart speaker 102. On this occasion, the data sending and receiving unit 801 also sends, to the smart speaker 102, an interactive session end notification which notifies for causing to end the interactive session with the user 107.

In the step S2004, in the smart speaker 102, the audio reproducing unit 705 of the audio control program 700 reproduces the audio synthesis data received in the step S2003. Thus, the smart speaker 102 notifies the user 107 of an audio message, for example, "Please select a file to print".

In the step S2005, the operation target determination unit 606 of the device control program 600 detects whether or not the user 107 has selected/executed a job in the job list displayed on the operating panel 209 of the MFP 101 in the step S2002. Upon detecting the selection/execution of the job by the user 107, the operation target determination unit 606 notifies the job control unit 603 of the device control program 600 of this detection result. The job control unit 603 carries out an executing process for the job based on this detection result (step S2002).

As described above, the operation of the information processing system controlled by audio is varied according to the attribute information, namely, the information indicating whether or not the MFP 101 is equipped with the smart speaker 102.

For example, when the user 107 performs an audio operation "Please print today's documents" on the smart speaker 102, the operation of the information processing system is differently controlled according to whether or not the smart speaker 102 is located near the MFP 101.

As shown in FIG. 21A, when the smart speaker 102 is located near the MFP 101, the user 107 is able immediately perform an operation on the operating panel 209 of the MFP 101. Thus, the information processing system displays a job list on the operating panel 209 of the MFP 101 and also reproduces an audio message "Please select a file to print" through the smart speaker 102.

On the other hand, as shown in FIG. 21B, when the smart speaker 102 is not located near the MFP 101, the user 107 is not able to immediately perform an operation on the operating panel 209 of the MFP 101. Thus, the information processing system causes the MFP 101 to print a first job in the job list and also reproduces an audio message "The most recent file has been printed" through the smart speaker 102.

As a result, the usability of the overall information processing system can be improved.

A description will now be given of an embodiment 2.

A hardware arrangement in the embodiment 2 differs from the one in the embodiment 1 in that the smart speaker 102 has an LUI that receives user's touch operation, in addition to the hardware arrangement illustrated in FIG. 3. It should be noted that a software arrangement in the embodiment 2 is the same as the one in the embodiment 1.

In the embodiment 1, data that is sent together with audio data from the smart speaker 102 to the cloud server 103 is only attribute information (the steps S1006, 1007 in FIG. 10). On the other hand, in the embodiment 2, the data that is sent together with the audio data from the smart speaker 102 to the cloud server 103 include not only attribute information but also information indicating whether or not the smart speaker 102 has the LUI (device configuration information).

In the following description, the same features of the hardware arrangement and the software arrangement as those in the embodiment 1 are designated by the same reference symbols, the same descriptions therefor are, therefore, omitted.

<Control Sequence Executed when a User Input Audio into a Smart Speaker not-Located Near an MFP but with a LUI>

Figure 15:
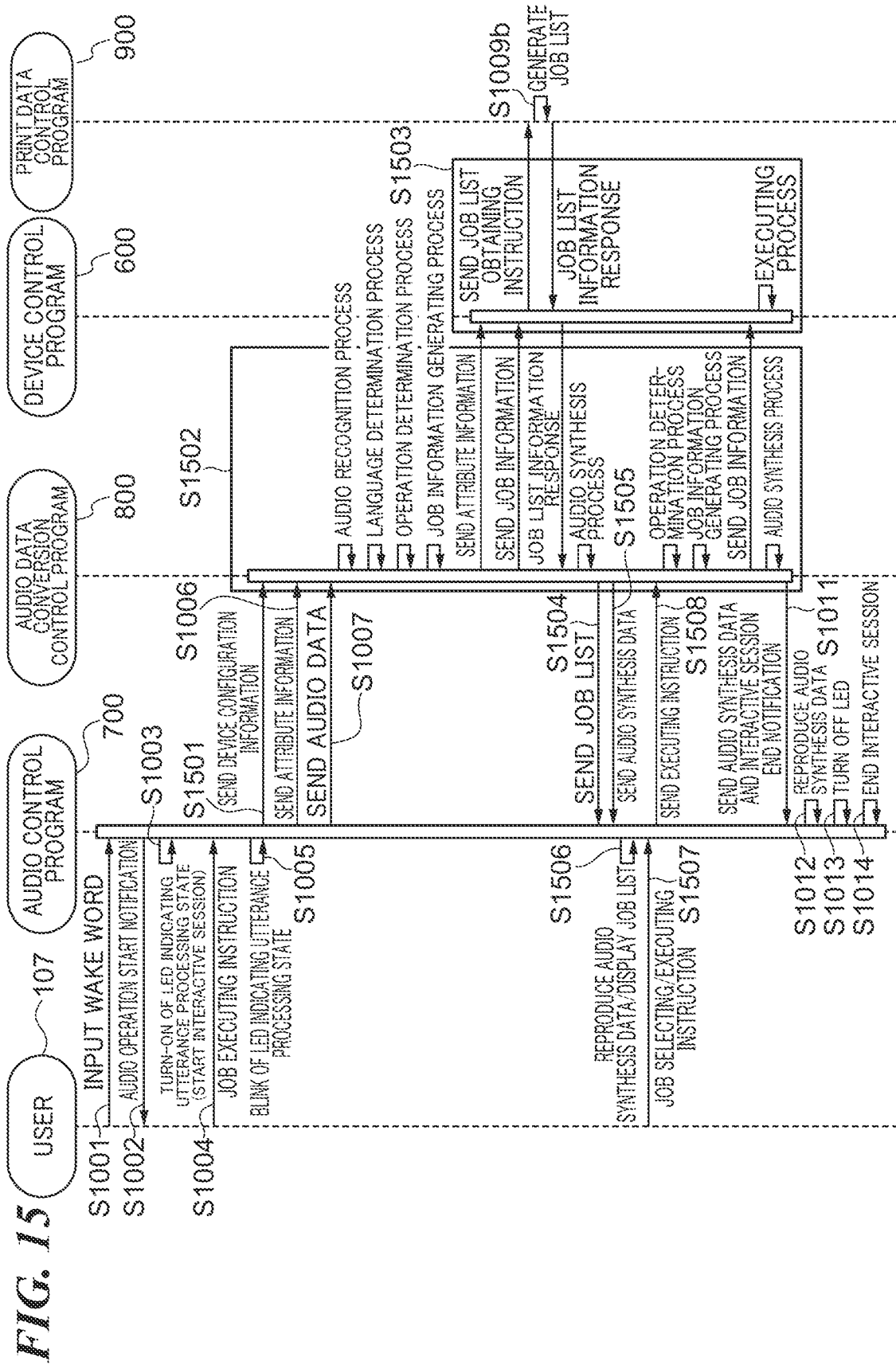
FIG. 15 is a sequence diagram showing exchanges among control programs executed by the apparatuses constituting the information processing system in an embodiment 2 when the smart speaker is not located near the MFP.

FIG. 15 is a sequence diagram showing exchanges among the control programs executed by the apparatuses constituting the information processing system in the embodiment 2 when the smart speaker 102 is not located near the MFP 101.

In the sequence shown in FIG. 15, it is assumed that, the smart speaker 102, the MFP 101, the cloud server 103, and the print server 106 are in a state of being able to communicate with one another. It is also assumed that the MFP 101 is displaying a home screen through which functions such as copying, scanning, printing, and faxing can be called after the start-up by turning-on the power.

A description will now be given of steps in the sequence in FIG. 15 differing from those in the sequence in FIG. 10. Specifically, referring to FIG. 15, device configuration information is sent (step S1501) at the same timing when attribute information and audio information are sent (the steps S1006, S1007 in FIG. 10). Moreover, step S1502 is executed in place of the steps S1008 and S1010 in FIG. 10, and step S1503 is executed in place of the step S1009a in FIG. 10. Further, steps S1504 to S1508 are executed prior to the step S1011 in FIG. 10.

The other steps in FIG. 15 are the same as those in FIG. 10, and hence they are designated by the same reference symbols, the same descriptions therefor are omitted.

In the present sequence, the steps S1001 to S1005 described above with referring to FIG. 10 are executed first, and then the process proceeds to the step S1501.

In the step S1501, the data sending and receiving unit 701 (device configuration information notification means) of the audio control program 700 sends, to the cloud server 103, device configuration information indicating that the smart speaker 102 has the LUI. It should be noted that the device configuration information is held in the data management unit 702 of the audio control program 700.

As with the sequence in FIG. 10, in the steps S1006 and S1007, the data sending and receiving unit 701 of the audio control program 700 sends attribute information and audio data to the cloud server 103. In this process, the attribute information is information indicating whether or not the MFP 101 is equipped with the smart speaker 102. It should be noted that in the example shown in FIG. 15, the attribute information indicating that the MFP 101 is not equipped with the smart speaker 102 is sent to the cloud server 103.

In the step S1502, in the cloud server 103, the audio data conversion unit 808 carries out a process according to the device configuration information, the attribute information, and the audio data, received by the data sending and receiving unit 801 of the audio data conversion control program 800. Detailed description of the process in the step S1502 will be given later with reference to FIG. 16.

In the steps S1503 and S1009b, the device control program 600 of the MFP 101 and the print data control program 900 of the print server 106 collaborate with each other to carry out a process according to attribute information and job information received from the cloud server 103. Thus, by the processes in the steps S1503 and S1009b (detailed description thereof will be given later with reference to FIG. 17), a job list information response including information on a job list generated by the print server 106 is sent from the MFP 101 to the cloud server 103. The audio synthesis unit 807 of the audio data conversion control program 800 carries out a process according to the job list information response received from the MFP 101 to generate audio synthesis data (step S1502).

In the step S1504, the data sending and receiving unit 801 sends the job list, which is included in the job list information response sent from the print server 106, to the smart speaker 102.

In the step S1505, the data sending and receiving unit 801 sends the audio synthesis data, which is generated in the cloud server 103 by the process carried out according the job list information response, to the smart speaker 102. The data sending and receiving unit 801 also sends, to the smart speaker 102, an interactive session end notification which notifies for causing to end the interactive session with the user 107.

In the step S1506, in the smart speaker 102, the audio reproducing unit 705 of the audio control program 700 reproduces the audio synthesis data sent in the step S1505. For example, the audio synthesis data "Today's most recent file will be printed" generated in the step S1009b is reproduced through the speaker 310. The indication unit 706 displays the job list sent in the step S1504 on the LUI of the smart speaker 102.

In the step S1507, the smart speaker 102 receives an instruction of selection/execution of a job, input by the user 107 via the LUI, from among the job list which is displayed by the indication unit 706.

In the step S1508, in the smart speaker 102, the data sending and receiving unit 701 sends the executing instruction received in the step S1507 to the cloud server 103. The cloud server 103 carries out a process according to this executing instruction and generates synthetic audio data according to the process (step S1502).

After that, as with the process in FIG. 10, the steps S1011 to S1014 are executed.

It should be noted that as with the sequence in FIG. 10, the smart speaker 102 is in the response processing state in the sequence in FIG. 15, namely, the wake word can always be input even while the LED 312 is blinking. Thus, while an interactive session is continued, the user 107 can forcefully end the interactive session by saying "Stop", "Cancel", or the like after uttering the wake word.

<Flowchart of the Process in the Step S1502 in FIG. 15 in a Cloud Server>

Figure 16:
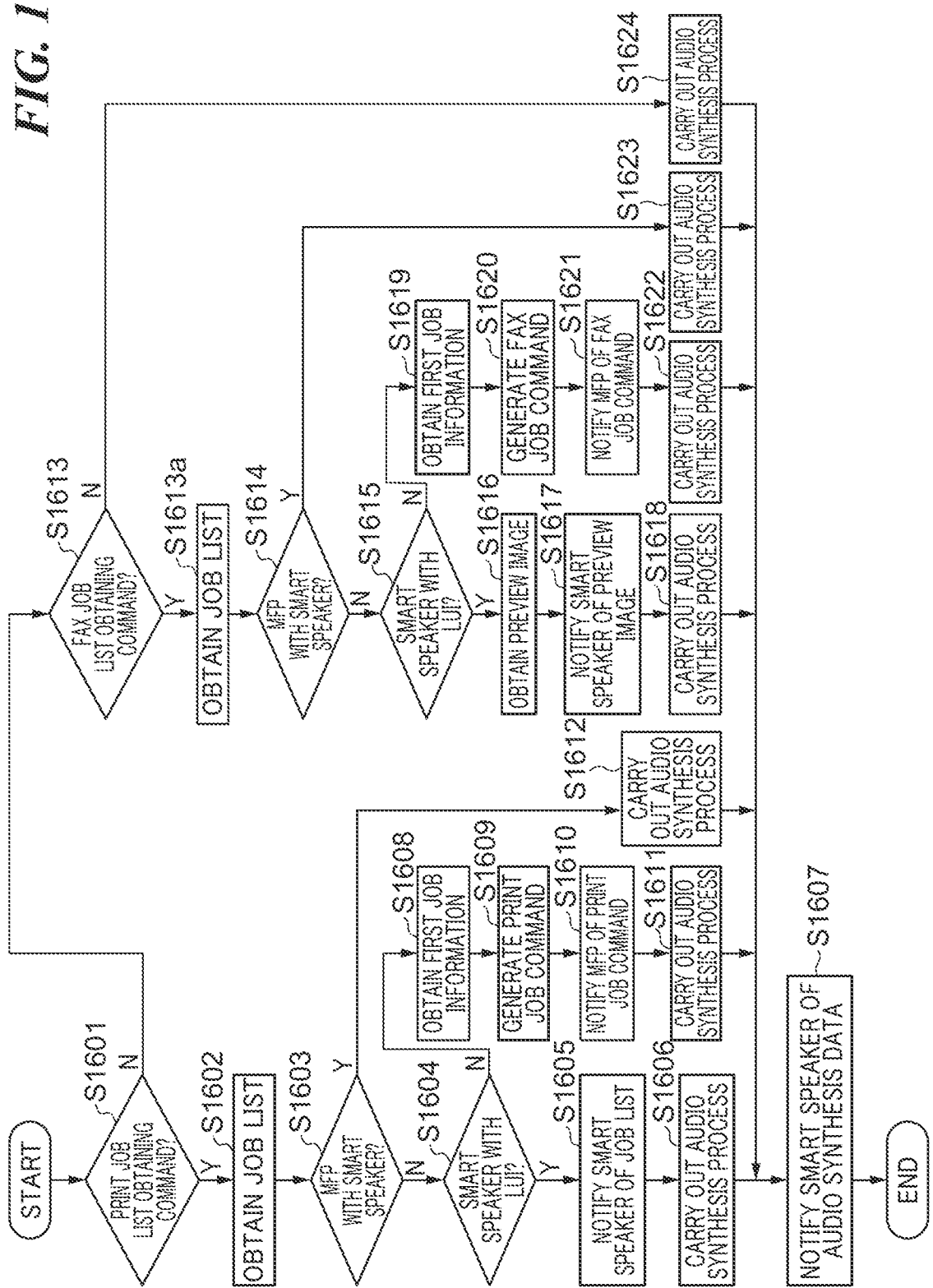
FIG. 16 is a flowchart of a process in step S1502 in FIG. 15.

FIG. 16 is a flowchart showing the details of the process in the step S1502 in FIG. 15, namely, the process that is carried out in the cloud server 103 according to device configuration information, attribute information, and audio data, received by the data sending and receiving unit 801 of the audio data conversion control program 800.

In step S1601, first, the CPU 402 carries out the processes in the steps S1101 to S1103 in FIG. 11 and determines whether or not an information obtaining job command generated in the step S1102 is a print job list obtaining command. When the information obtaining job command is the print job list obtaining command (YES in the step S1601), the process proceeds to step S1602, and when the information obtaining job command is another command (NO in the step S1601), the process proceeds to step S1613.

In the step S1602, by sending the print job list obtaining command to the MFP 101 (step S1103), the CPU 402 obtains a job list included in a job list information response sent from the MFP 101. Specifically, the data that is sent to the MFP 101 here is data 1401 shown in FIG. 14 including the print job list obtaining command and the attribute information.

In the step S1603, the CPU 402 refers to the attribute information obtained from the smart speaker 102 and determines whether or not the MFP 101 is equipped with the smart speaker 102. When the MFP 101 is not equipped with the smart speaker 102 (NO in the step S1603), the process proceeds to step S1604, and when the MFP 101 is equipped with the smart speaker 102 (YES in the step S1603), the process proceeds to step S1612.

In the step S1604, the CPU 402 refers to the device configuration information obtained from the smart speaker 102 and determines whether or not the smart speaker 102 is equipped with the LUI. When the smart speaker 102 is equipped with the LUI (YES in the step S1604), the process proceeds to step S1605, and when the smart speaker 102 is not equipped with the LUI (NO in the step S1604), the process proceeds to step S1608.

In the step S1605, the CPU 402 notifies the smart speaker 102 of the job list obtained in the step S1602. After that, the LUI of the smart speaker 102 displays the job list notified of to the smart speaker 102 from the cloud server 103 (the step S1506 in FIG. 15).

In step S1606, the CPU 402 carries out an audio synthesis process for generating audio information to be notified of to the smart speaker 102, for example, audio synthesis data such as "A job list is displayed. Please select a file to print". Then, in the step S1607, the CPU 402 notifies the smart speaker 102 of the audio synthesis data generated in the step S1606 and ends the present process. After that, the audio reproducing unit 705 of the smart speaker 102 reproduces the audio synthesis data communicated from the cloud server 103 in the step S1607 (the step S1506 in FIG. 15).

Thus, according to an audio notification such as "A job list is displayed. Please select a file to print" from the smart speaker 102, the user 107 can easily select a file to print from the job list displayed on the LUI.

In step S1608, the CPU 402 obtains information on a first job in the job list (hereafter referred to as "first job information") obtained in the step S1602.

In step S1609, the CPU 402 generates a print job command based on the first job information obtained in the step S1608.

In step S1610, the CPU 402 notifies the MFP 101 of the print job command (job information) generated in the step S1609.

In step S1611, the CPU 402 carries out an audio synthesis process for generating audio synthesis data for notifying the user 107 that the print job command has been notified of to the MFP 101. For example, the CPU 402 generates audio synthesis data comprised of a message such as "The most recent file among files on today's date was printed." The CPU 402 then, in step S1607, notifies the smart speaker 102 of the audio synthesis data generated in the step S1611, and ends the present process.

In step S1612, the CPU 402 carries out an audio synthesis process for generating audio synthesis data to be notified of to the smart speaker 102. For example, the CPU 402 generates audio synthesis data comprised of a message such as "A job list is displayed. Please select a file to print." Then, in the step S1607, the CPU 402 notifies the smart speaker 102 of the audio synthesis data generated in the step S1612 and ends the present process.

In step S1613, the CPU 402 determines whether or not an information obtaining job command generated in the step S1102 is a fax job list obtaining command. When the information obtaining job command is the fax job list obtaining command (YES in the step S1613), the process proceeds to step S1614, and when the information obtaining job command is not the fax job list obtaining command (NO in the step S1613), the process proceeds to step S1624.

In step S1613a, by sending the fax job list obtaining command to the MFP 101 (the step S1103), the CPU 402 obtains a job list included in the job list information response sent from the MFP 101. Specifically, the data that is sent to the MFP 101 here is data 1901, shown in FIG. 19, including the fax job list obtaining command, attribute information, and device configuration information.

In the step S1614, the CPU 402 refers to the attribute information obtained from the smart speaker 102 and determines whether or not the MFP 101 is equipped with the smart speaker 102. When the MFP 101 is not equipped with the smart speaker 102 (NO in the step S1614), the process proceeds to step S1615, and when the MFP 101 is equipped with the smart speaker 102 (YES in the step S1614), the process proceeds to step S1623.

In step S1615, the CPU 402 refers to the device configuration information obtained from the smart speaker 102 and determines whether or not the smart speaker 102 is equipped with the LUI. When the smart speaker 102 is equipped with the LUI (YES in the step S1615), the process proceeds to step S1616, and when the speaker 102 is not equipped with the LUI (NO in the step S1615), the process proceeds to step S1619.

In the step S1616, the CPU 402 obtains, from the MFP 101, a preview image(s) of received fax data, which are targeted for printing in respective fax jobs obtained in the step S1613a. Specifically, the CPU 402 sends a preview image obtaining command to the MFP 101. As a result, a preview image response including the preview images of the received fax data, which are targeted for printing in respective fax jobs, is sent from the MFP 101 to the CPU 402.

In step S1617, the CPU 402 notifies the smart speaker 102 of the preview images obtained in the step S1616 through the data sending and receiving unit 701. Then, the LUI of the smart speaker 102 displays the preview images notified of by the cloud server 103 in the step S1617.

In step S1618, the CPU 402 carries out an audio synthesis process for generating audio information to be notified of to the smart speaker 102, for example, audio synthesis data comprised of a message such as "Preview images of received fax data are displayed. Please select a fax to print." Then, in step S1607, the CPU 402 notifies the smart speaker 102 of the audio synthesis data generated in the step S1608, and ends the present process. After that, the audio reproducing unit 705 of the smart speaker 102 reproduces the audio synthesis data notified of from the cloud server 103.

As a result, in accordance with an audio notification such as "Preview images of received fax data are displayed. Please select a fax to print" from the smart speaker 102, the user 107 can easily select fax data to print from the preview images displayed on the LUI.

In the step S1619, the CPU 402 obtains information on a first job in the job list (hereafter referred to as "first job information") obtained in the step S1613a.

In step S1620, the CPU 402 generates a fax job command based on the first job information obtained in the step S1619.

In step S1621, the CPU 402 notifies the MFP 101 of the fax job command (job information) generated in the step S1620.

In step S1622, the CPU 402 carries out an audio synthesis process for generating audio synthesis data for notifying the user 107 that the fax job command has been notified of to the MFP 101. For example, the CPU 402 generates audio synthesis data comprised of a message such as "A fax was printed." Then, in step S1607, the CPU 402 notifies the smart speaker 102 of the audio synthesis data generated in the step S1622, and ends the present process.

In step S1623, the CPU 402 carries out an audio synthesis process for generating audio synthesis data to be notified of to the smart speaker 102. For example, the CPU 402 generates audio synthesis data comprised of a message such as "Preview images of received fax data are displayed. Please select a fax to print". Then, in the step S1607, the CPU 402 notifies the smart speaker 102 of the audio synthesis data generated in the step S1623, and ends the present process.

In step S1624, the CPU 402 carries out an audio synthesis process for generating audio synthesis data to be notified of to the smart speaker 102. For example, the CPU 402 generates audio synthesis data comprised of a message such as "This command cannot be executed". Then, in the step S1607, the CPU 402 notifies to the smart speaker 102 of the audio synthesis data generated in the step S1624, and ends the present process.

<Flowchart of the Process in the Step S1503 in FIG. 15 in an MFP>

Figure 17:
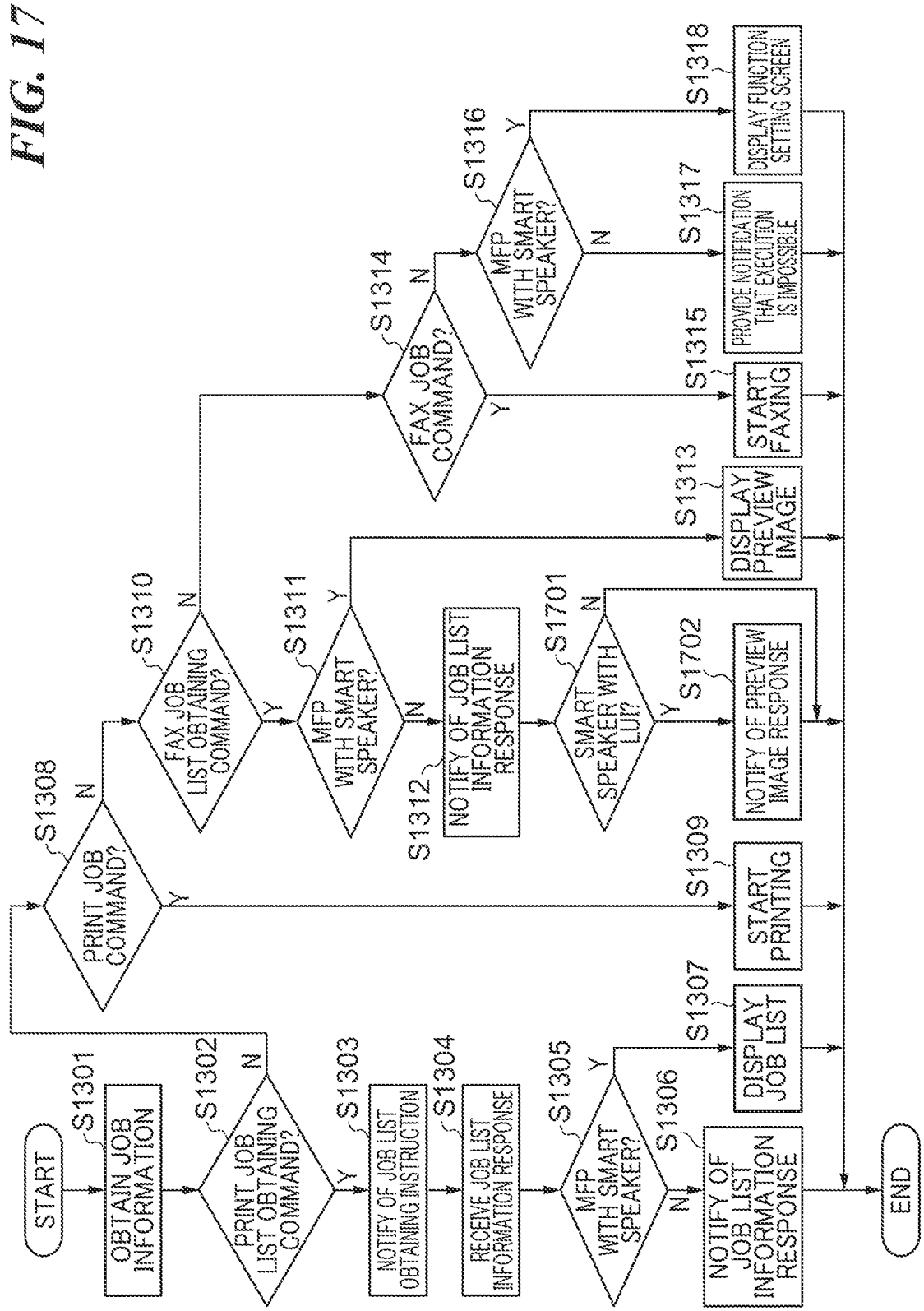
FIG. 17 is a flowchart of a process in step S1503 in FIG. 15.

FIG. 17 is a flowchart showing the details of the process in the step S1503 in FIG. 15, namely, the process that is carried whenever the data sending and receiving unit 601 of the device control program 600 in the MFP 101 receives job information.

In the process in FIG. 13, upon determining in the step S1311 that the MFP 101 is not equipped with the smart speaker 102, the CPU 202 notifies the cloud server 103 of a job list information response (the step S1312), and ends the process in FIG. 13. On the other hand, in the process in FIG. 17, after carrying out the process in the step S1312, the CPU 202 carries out processes in steps S1701 and S1702, which will be described later, and then ends the process in FIG. 17.

In the following description, the same steps as those in FIG. 13 are designated by the same reference symbols, the same descriptions therefor are omitted. Therefore, only processes in the steps S1701 and S1702 will be now described.

In the step S1701, based on device configuration information (the step S1501 in FIG. 15) sent together with a fax job list obtaining command (job information) obtained in the step S1301, the CPU 202 determines whether or not the smart speaker 102 is equipped with the LUI. When the smart speaker 102 is equipped with the LUI (YES in the step S1701), the process proceeds to the step S1702, and when the smart speaker 102 is not equipped with the LUI (NO in the step S1701), the present process is ended.

In the step S1702, upon receiving a preview image obtaining command from the cloud server 103, the CPU 202 generates preview images of received fax data, which are targeted for printing in respective fax jobs held in the storage 205. The CPU 202 then notifies the cloud server 103 of a preview image response including the generated preview images.

<Flowchart of a Process in the Response Processing State of the Smart Speaker with a LUI>

Figure 18:
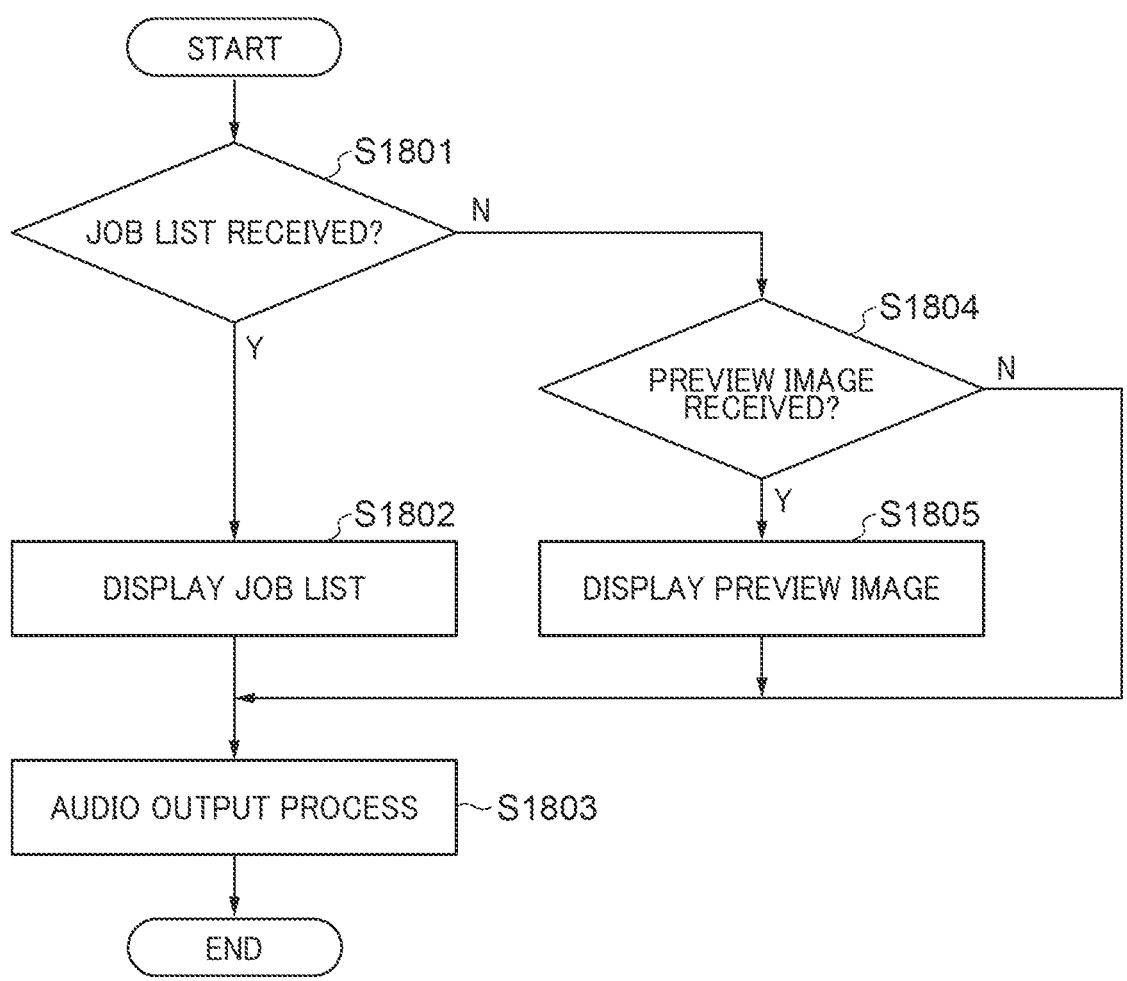
FIG. 18 is a flowchart of a process carried out in a response processing state of the smart speaker equipped with an LUI.

FIG. 18 is a flowchart showing the details of a process in the response processing state of the smart speaker 102 equipped with the LUI, namely, a process that is carried out in the smart speaker 102 when it has received response data such as audio synthesis data, from the cloud server 103.

In step S1801, the CPU 302 determines whether or not the data received from the cloud server 103 is a job list. When the received data is the job list (YES in the step S1801), the process proceeds to step S1802, and when the received data is not the job list (NO in the step S1801), the process proceeds to step S1804.

In the step S1802, the CPU 302 holds the job list received from the cloud server 103, in the storage 305, and displays the job list on the LUI. Then, in step S1803, the CPU 302 carries out an audio output process for providing an audio notification to the user 107 by reproducing audio synthesis data, which has been received together with the job list from the cloud server 103, through the speaker 310, and ends the present process.

In the step S1804, the CPU 302 determines whether or not the data received from the cloud server 103 consists of preview images of received fax data, which are targeted for printing in respective fax jobs in the job list which the user 107 has queried. When the received data consists of the preview images (YES in the step S1804), the process proceeds to step S1805, and when the received data does not consist of the preview images (NO in the step S1804), the process proceeds to the step S1803.

In the step S1805, the CPU 302 holds the preview images received from the cloud server 103 in the storage 305 and displays the preview images in list on the LUI. Then, in the step S1803, the CPU 302 carries out an audio output process for providing an audio notification to the user 107 by reproducing audio synthesis data, which has been received together with the preview images from the cloud server 103, through the speaker 310, and ends the present process.

As described above, the operation of the information processing system controlled by audio is varied according to whether or not the MFP 101 is equipped with the smart speaker 102 or whether or not the smart speaker 102 is equipped with the LUI. As a result, the usability of the overall information processing system can be improved.

The present invention is not limited to the embodiments 1 and 2 described above. For example, the present invention may be applied to an arrangement in which the operation of the information processing system is varied according to states of the smart speaker 102 and commands included in audio operations received by the smart speaker 102, as shown in FIG. 22.

It should be noted that in FIG. 22, "NEAR" indicates that attribute information indicating that the MFP 101 is equipped with the smart speaker 102 was sent to the cloud server 103 in the step S1006 in FIG. 10. Moreover, in FIG. 22, "ONLY AUDIO INPUT" indicates that attribute information indicating that the MFP 101 is not equipped with the smart speaker 102 was sent to the cloud server 103 in the step S1006 in FIG. 10.

In FIG. 22, "EQUIPPED WITH LUI" indicates that attribute information indicating that the MFP 101 is not equipped with the smart speaker 102, and device configuration information indicating that the smart speaker 102 is equipped with the LUI, were sent to the MFP 101 in the steps S1006 and S1501 in FIG. 15.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-094539, filed Jun. 4, 2021, which is hereby incorporated by reference wherein in its entirety.

What is claimed is:

1. A processing system that includes an image processing apparatus and is capable of communicating with an audio control apparatus, the processing system comprising:
one or more controllers configured to function as:
a unit configured to receive, from the audio control apparatus, audio information generated based on audio received from a user;
a unit configured to generate a command based on the audio information; and
a unit configured to output response information, as a response to the command,
wherein the one or more controllers are configured to:
(a) in a first case where a predetermined command, generated based on first audio information received from an audio control apparatus associated with first attribute information, is obtained, the one or more controllers output a first type of response information as a response to the predetermined command; and
(b) in a second case where the predetermined command, generated based on second audio information received from an audio control apparatus associated with second attribute information, is obtained, the one or more controllers output a second type of response information as the response to the predetermined command, and
wherein the first attribute information is information indicating that the audio control apparatus is located near the image processing apparatus.

2. The processing system according to claim 1, wherein the predetermined command is a command for executing a job using any of at least a fax function, a print function and a scan function.

3. The processing system according to claim 1, wherein the output of the first type of response information is a notification to the user using audio by the audio control apparatus and display by the image processing apparatus.

4. The processing system according to claim 1, wherein the predetermined command is a command for executing a job using a predetermined function, and
in a case where the image processing apparatus is not capable of executing the predetermined function, the one or more controllers
display a function setting screen for executing the predetermined function in a case where the audio control apparatus is associated with the first attribute information, and
notify the user that the predetermined function cannot be executed, by using the audio control apparatus, in a case where the audio control apparatus is associated with the second attribute information.

5. A processing system that includes an image processing apparatus and is capable of communicating with an audio control apparatus, the processing system comprising:

one or more controllers configured to function as:
a unit configured to receive, from the audio control apparatus, audio information generated based on audio received from a user;
a unit configured to generate a command based on the audio information; and
a unit configured to output response information, as a response to the command,
wherein the one or more controllers are configured to:
(a) in a first case where a predetermined command, generated based on first audio information received from an audio control apparatus associated with first attribute information, is obtained, the one or more controllers output a first type of response information as a response to the predetermined command; and
(b) in a second case where the predetermined command, generated based on second audio information received from an audio control apparatus associated with second attribute information, is obtained, the one or more controllers output a second type of response information as the response to the predetermined command, and
wherein the second attribute information is information indicating that the audio control apparatus is not located near the image processing apparatus.

6. A processing system that includes an image processing apparatus and is capable of communicating with an audio control apparatus, the processing system comprising:
one or more controllers configured to function as:
a unit configured to receive, from the audio control apparatus, audio information generated based on audio received from a user;
a unit configured to generate a command based on the audio information; and
a unit configured to output response information, as a response to the command,
wherein the one or more controllers are configured to:
(a) in a first case where a predetermined command, generated based on first audio information received from an audio control apparatus associated with first attribute information, is obtained, the one or more controllers output a first type of response information as a response to the predetermined command; and
(b) in a second case where the predetermined command, generated based on second audio information received from an audio control apparatus associated with second attribute information, is obtained, the one or more controllers output a second type of response information as the response to the predetermined command, and
wherein the output of the second type of response information is a notification to the user using audio by the audio control apparatus and not using display by the image processing apparatus.

7. An image processing apparatus that is capable of communicating with an audio control apparatus and a server, the image processing apparatus comprising:
one or more controllers configured to function as:
a unit configured to receive a command, which is generated by the server based on audio information generated by the audio control apparatus based on audio received from a user; and
a unit configured to output response information, as a response to the command,
wherein the one or more controllers are configured to:
(a) in a first case where a predetermined command, generated based on first audio information received from an audio control apparatus associated with first attribute information, is obtained, the one or more controllers output a first type of response information as a response to the predetermined command; and
(b) in a second case where the predetermined command, generated based on second audio information received from an audio control apparatus associated with second attribute information, is obtained, the one or more controllers output a second type of response information as the response to the predetermined command, and
wherein the first attribute information is information indicating that the audio control apparatus is located near the image processing apparatus.

8. A control method for an image processing apparatus that is capable of communicating with an audio control apparatus and a server, the control method comprising:
receiving a command, which is generated by the server based on audio information generated by the audio control apparatus based on audio received from a user; and
outputting response information, as a response to the command,
wherein the outputting the response information includes outputting, in a first case where a predetermined command, generated based on first audio information received from an audio control apparatus associated with first attribute information is obtained, a first type of response information as a response to the predetermined command,
wherein the outputting the response information includes outputting, in a second case where the predetermined command, generated based on second audio information received from an audio control apparatus associated with second attribute information, is obtained, a second type of response information as the response to the predetermined command, and
wherein the first attribute information is information indicating that the audio control apparatus is located near the image processing apparatus.

* * * * *